US011681965B2

(12) United States Patent
Hartley et al.

(10) Patent No.: US 11,681,965 B2
(45) Date of Patent: Jun. 20, 2023

(54) SPECIALIZED COMPUTING ENVIRONMENT FOR CO-ANALYSIS OF PROPRIETARY DATA

(71) Applicant: GEORGETOWN UNIVERSITY, Washington, DC (US)

(72) Inventors: David Hartley, Rockville, MD (US); Ophir Frieder, Chevy Chase, MD (US)

(73) Assignees: Georgetown University, Washington, DC (US); Children's Hospital Medical Center, Cincinnati, OH (US)

( * ) Notice: Subject to any disclaimer, the term of this patent is extended or adjusted under 35 U.S.C. 154(b) by 657 days.

(21) Appl. No.: 16/663,547

(22) Filed: Oct. 25, 2019

(65) Prior Publication Data

US 2021/0125119 A1    Apr. 29, 2021

(51) Int. Cl.
*G06Q 10/0635* (2023.01)
*G06F 16/215* (2019.01)
(Continued)

(52) U.S. Cl.
CPC ....... *G06Q 10/0635* (2013.01); *G06F 16/215* (2019.01); *G06F 21/00* (2013.01);
(Continued)

(58) Field of Classification Search
CPC ............ G06Q 10/0635; G06Q 2220/10; G06F 16/215; G06F 21/602; G06F 21/6218; G06F 21/6254; G06F 21/86
See application file for complete search history.

(56) References Cited

U.S. PATENT DOCUMENTS

| 5,892,900 | A | * | 4/1999 | Ginter | G06F 21/78 |
| | | | | | 726/26 |
| 6,055,634 | A | * | 4/2000 | Severwright | H04L 63/105 |
| | | | | | 713/153 |

(Continued)

OTHER PUBLICATIONS

US 5,544,380 A, 08/1996, Liu et al. (withdrawn)
(Continued)

*Primary Examiner* — John W Hayes
*Assistant Examiner* — Dennis G Keritsis
(74) *Attorney, Agent, or Firm* — Blank Rome LLP

(57) ABSTRACT

A specialized computing environment that includes hardware and data security features to enable competitive organizations to co-analyze proprietary data without revealing the underlying proprietary data to unauthorized users. Proprietary data are stored in volatile memory, which may be automatically erased according to pre-stored criteria. The analysis is performed automatically by a processing unit without human intervention. Analytical results are sanitized (e.g., using data masking) to prevent the analytical result from being tracible to any particular data source. Sanitized analytical results are output without outputting the underlying proprietary data (except to users authorized to validate analytical results). The computing environment is enclosed within a secure enclosure (e.g., a steel box with a lock), does not include any peripheral devices outside the secure enclosure, does not communicate wirelessly, and does not have hardware ports accessible from outside the secure enclosure (except, in some embodiments, a wired connection for a web server).

18 Claims, 11 Drawing Sheets

(51) Int. Cl.
  *G06F 21/60* (2013.01)
  *G06F 21/62* (2013.01)
  *G06F 21/00* (2013.01)

(52) U.S. Cl.
  CPC ........ *G06F 21/602* (2013.01); *G06F 21/6218* (2013.01); *G06F 21/6254* (2013.01); *G06F 2212/7205* (2013.01); *G06F 2221/2143* (2013.01); *G06Q 2220/10* (2013.01)

(56) References Cited

U.S. PATENT DOCUMENTS

| | | | |
|---|---|---|---|
| 6,292,898 B1* | 9/2001 | Sutherland | G06F 21/87 |
| | | | 713/193 |
| 6,523,026 B1 | 2/2003 | Gillis | |
| 6,792,419 B1 | 9/2004 | Raghavan | |
| 7,093,139 B2* | 8/2006 | Silverbrook | H04L 9/002 |
| | | | 713/193 |
| 7,210,009 B2* | 4/2007 | Gulick | G06F 21/79 |
| | | | 713/193 |
| 8,214,913 B2* | 7/2012 | Chung | G06F 21/86 |
| | | | 726/34 |
| 8,635,672 B2* | 1/2014 | Yamada | G06F 21/79 |
| | | | 726/4 |
| 9,667,514 B1 | 5/2017 | Wagner, Jr. et al. | |
| 10,459,849 B1* | 10/2019 | Shorb | G06F 11/2041 |
| 10,621,379 B1* | 4/2020 | Kim | G06F 21/6254 |
| 10,970,423 B2* | 4/2021 | Soffer | G06F 21/86 |
| 11,188,668 B2* | 11/2021 | Jäger | G06F 21/6227 |
| 11,210,424 B1* | 12/2021 | Dakic | G06N 20/20 |
| 11,328,069 B2* | 5/2022 | Le Gargean | G11B 5/024 |
| 11,379,860 B2* | 7/2022 | Pathare | G06Q 30/0201 |
| 2002/0159229 A1* | 10/2002 | Searby | G06F 1/181 |
| | | | 361/726 |
| 2003/0212649 A1 | 11/2003 | Denesuk et al. | |
| 2005/0213295 A1* | 9/2005 | Perez | G06F 1/181 |
| | | | 361/679.57 |
| 2005/0256997 A1* | 11/2005 | Koren | G11C 16/102 |
| | | | 711/159 |
| 2006/0080554 A1* | 4/2006 | McDonald | G06F 21/6254 |
| | | | 713/189 |
| 2009/0031095 A1* | 1/2009 | Merry, Jr. | G11C 16/22 |
| | | | 711/E12.001 |
| 2009/0183011 A1* | 7/2009 | Martin | G06F 21/86 |
| | | | 713/194 |
| 2009/0187525 A1 | 7/2009 | Agrawal et al. | |
| 2010/0157528 A1* | 6/2010 | Schmitt | H05K 5/0208 |
| | | | 361/679.01 |
| 2010/0228731 A1 | 9/2010 | Gollapudi | |
| 2012/0096042 A1 | 4/2012 | Brockett et al. | |
| 2012/0179421 A1 | 7/2012 | Dasgupta | |
| 2013/0238356 A1 | 9/2013 | Torii et al. | |
| 2014/0096249 A1 | 4/2014 | Dupont et al. | |
| 2014/0187173 A1* | 7/2014 | Partee | H04L 43/045 |
| | | | 455/67.12 |
| 2015/0058344 A1 | 2/2015 | Bhatia et al. | |
| 2015/0213109 A1* | 7/2015 | Kassko | G06F 16/2219 |
| | | | 707/603 |
| 2015/0235049 A1 | 8/2015 | Cohen et al. | |
| 2015/0235138 A1 | 8/2015 | Frieder et al. | |
| 2016/0034217 A1* | 2/2016 | Kim | G06F 3/0608 |
| | | | 711/103 |
| 2016/0358087 A1* | 12/2016 | Frieder | G06F 40/40 |
| 2017/0075877 A1 | 3/2017 | Lepeltier | |
| 2017/0300340 A1* | 10/2017 | Ellis, II | G06F 13/4282 |
| 2018/0288049 A1* | 10/2018 | Donlan | G06F 13/4282 |
| 2018/0336256 A1* | 11/2018 | Li | G06F 16/2272 |
| 2018/0337948 A1* | 11/2018 | Chu | H04L 69/08 |
| 2019/0095657 A1* | 3/2019 | Norton | G06F 21/86 |
| 2019/0114078 A1* | 4/2019 | Oh | G06F 3/0604 |
| 2019/0130135 A1* | 5/2019 | Park | G06F 3/0652 |
| 2019/0272162 A1* | 9/2019 | Couillard | H04L 9/088 |
| 2019/0303118 A1* | 10/2019 | Avinash Dorle | H04L 41/16 |
| 2019/0370114 A1* | 12/2019 | Troia | G06F 11/1417 |
| 2020/0099658 A1* | 3/2020 | Couillard | H04L 63/0209 |
| 2020/0311304 A1* | 10/2020 | Parthasarathy | G06F 21/6218 |
| 2020/0357059 A1* | 11/2020 | Kennedy | G06N 7/00 |
| 2021/0119765 A1* | 4/2021 | Jankly | H04L 9/0891 |
| 2021/0181986 A1* | 6/2021 | Lee | G06F 3/064 |
| 2021/0195596 A1* | 6/2021 | McFarlane | H04W 84/18 |
| 2022/0045842 A1* | 2/2022 | Shi | G06Q 20/389 |
| 2022/0222372 A1* | 7/2022 | Larson | G06F 21/604 |

OTHER PUBLICATIONS

Metal-Oxide-Semiconductor_(MOS)_Fundamentals (Year: 2022).*
International Search Report and Written Opinion dated Aug. 19, 2019; International Application No. PCT/US2019/034824; International Filing Date: May 31, 2019; 10 pages.
Gerald Whitaker et al., "A hybrid genetic algorithm for multiobjective problems with activity analysis-based local search", 2009 [Online] Downloaded Aug. 6, 2019 https://pubag.nal.usda.gove/download/22943/PDF (Year: 2009); 9 pages.
Donald Jones, "A taxonomy of Global Optimization Methods based on Response Surfaces", 2001 [Online] Downloaded Aug. 6, 2019 https://rd.springer.com/content/pdf/10.1023%2FA%3A1012771025575.pdf (Year: 2001); 39 pages.
"On Some Feature Selection Strategies for Spam Filter Design", Ren Wang, Amr. M Youssef, Ahmed K. Elhakee, Electrical and Computer Engineering. CCECE '06. Canadian Conference on May 7-10, 2006; pp. 2155-2158.
Manzup "Array, Vector and Stack Data Structures for Absolute Beginners" Verified by wayback machine to Mar. 2013. [Online] Downloaded https://web.archive.org/web/20130428200256/https://www.go4expert.com/articles/array-vector-stack-data-structures-t27921; 8 pages.
International Search Report and Written Opinion dated Jan. 15, 2020; International Application No. PCT/US19/58167; International Filing Date: Oct. 25, 2019; 15 pages.

\* cited by examiner

SPECIALIZED COMPUTING ENVIRONMENT FOR CO-ANALYSIS OF PROPRIETARY DATA

CROSS-REFERENCE TO RELATED APPLICATIONS

None

FEDERAL FUNDING

None

BACKGROUND

The systematic monitoring of "big data" to gain robust understanding within a particular domain is a pillar of modern commerce, research, security, health care, and other fields. Governments and other organizations seek situational awareness, real-time indications and warnings, and short- to long-term forecasting. If properly analyzed, even publicly-available open source data (that is seemingly benign) can be used to identify leading indicators of events of interest to those governments and organizations. Additionally, organizations may have access to proprietary information that, if properly analyzed, can offer insight into the domain of the organization. However, the total amount of digital information publicly available on global networks is increasing exponentially and cannot be manually reviewed, even by a large group of humans, to quickly identify all relevant data for a given subject or project.

The demand for processing large volumes of digital data in real time is particularly heightened in the areas of national security, law enforcement, and intelligence. Agencies faced with ongoing digital and physical threats from various parts of the world are tasked with warning communities before an attack, implementing emergency preparedness, securing borders and transportation arteries, protecting critical infrastructure and key assets, and defending against catastrophic terrorism. Similar demands also exist in other surveillance areas, including natural disasters, humanitarian emergencies, public health events, public opinion, consumer product issues, and morale.

Capability to detect potential events early on and monitor such plots continuously before they are carried out is most critical. The data on global networks can potentially give information-seeking organizations all the information they need. The key question is how to effectively and carefully sort and search vast amounts of data.

The conventional approach to identifying events of interest is to examine data or streams of data for keywords related to topics of interest. When relevant documents are detected (e.g., by Boolean keyword searches, logistic regression, and/or Bayesian or other classifiers), they are then made available to human analysts, who examine the resulting corpus of retrieved material and form interpretations. Another common approach is to monitor a numerical variable (e.g., temperature, rainfall, number of inspection alerts, etc.) for anomalies and, when an anomaly is found or thought to be found, focus additional scrutiny or possibly undertake an investigation looking for a potential event.

While these conventional methods are the norms, they are often inefficient. They are often done on an ad hoc basis once an event (for example, a food safety event) has been discovered or hypothesized. Accordingly, conventional methods run the risk of not identifying surprises because surprises do not occur frequently (and are therefore unlikely to be considered as an interpretation of observed data) and, by definition, conventional methods rely on a priori knowledge. For example, keyword searches look for terms identified by a human analyst, machine classifiers are trained on the familiar, and logistic regression looks for risk factors of predefined, desired outcomes. Similarly, monitoring numerical variables that are "born digital" (e.g., meteorological factors from sensors or counts of tests failed at inspection centers) can be limited in terms of sensitivity and specificity and may or may not be appropriate for the gamut of events of interest.

Data for food event surveillance, for example, are generally drawn from many sources. The providence of those data (who produced the data, how were they measured, and the path the data took between production and acquisition) must be understood so that limitations and bias can be assessed (and estimated if possible). How data are cleaned (i.e., prepared for machine analysis) and how they are processed can introduce further error and bias, which must be understood if results are to be interpreted correctly. Methods centered on data not born digitally (or data of unknown or questionable providence or data that are not cleaned according to a consistent methodology) produce results that can be unclear if assumptions regarding the data are made that are not documented, normally explored, or defensible.

Recent patent applications have described systems that allow the available corpus of data (usually publicly-available documents) to dictate potential hypotheses or potential events. U.S. Pat. Pub. No. 2015/0235138 and U.S. Pat. Pub. No. 2016/0358087 describe coding documents according to the ontology, populating a multi-dimensional ontology space by adding points in the ontology space that correspond to ontological vectors found in the documents, and using an optimization algorithm (e.g., simulated annealing, a Monte Carlo-based algorithm, a genetic algorithm, etc.) to identify highly-populated neighborhoods in the ontology space. PCT Pat. Appl. No. PCT/US2019/034824 further describes event recognition functionality that analyzes documents to construct qualitative metrics (e.g., the frequency of user-specified keywords, the sentiment or emotion expressed in documents, the occurrence of ontological terms from a user-supplied ontology, the evolution of topics in the data, etc.) and establishes a baseline for those metrics. As additional documents are identified over time, the event recognition system compares those qualitative metrics to the baseline and outputs an updated baseline for display to a user. The event recognition system may also identify a potential event of interest, for example if the qualitative metrics in the additional documents deviate from the earlier-identified baseline. The event recognition system may also identify a geographic region of interest, for example by identifying a named place in one of the documents where a numerical metric deviates from the baseline or by determining that one of the documents where a numerical metric deviates from the baseline is included in a publication from or focused on a geographic region. The event recognition system described in PCT Pat. Appl. No. PCT/US2019/034824 may also be used to test the hypotheses generated by the systems described in U.S. Pat. Pub. No. 2015/0235138 and U.S. Pat. Pub. No. 2016/0358087. (The contents of the aforementioned patent applications are hereby incorporated by reference.)

The hypothesis generation systems described in U.S. Pat. Pub. No. 2015/0235138 and U.S. Pat. Pub. No. 2016/0358087 and the event recognition system described in PCT Pat. Appl. No. PCT/US2019/034824 are typically used to analyze publicly-available data. Organizations (businesses, hospitals, government agencies, etc.) may also use those systems to analyze their own proprietary data. However, the data that are available to each organization is only one piece of the overall puzzle.

Stakeholders recognize their common interest to thwart or mitigate threats early because these threats impact perception of an entire product/commodity class. In the food industry, for example, if one food product made by a particular brand is identified with a contaminant, consumers will stop buying that food no matter who manufactures it. Organizations sharing their proprietary data to recognize and mitigate threats is in everyone's best interest. For example, a large group of children's hospitals (in a network called Solutions for Patient Safety, https://www.solutionsforpatientsafety.org/) actually do cooperate and share data related to the incidence of safety events to identify best practices for medical safety.

However, organizations will not share their sensitive or protected data unless they can be assured that revealing that proprietary information will not negatively impact their organization or preferentially benefit their competitors. Accordingly, there is a need for a system that enables co-analysis (e.g., hypothesis generation, surveillance, etc.) using protected data streams without revealing the underlying protected data to unauthorized organizations or individuals.

SUMMARY

To overcome those and other drawbacks in the prior art, a specialized computing environment is provided that allows organizations that are otherwise competitive to co-analyze proprietary data that previously could not be shared for legal or competitive reasons. The specialized computing environment hosts a co-analysis system that uses those proprietary data streams to generate hypotheses and construct and compare numerical metrics that may be leading indicators of socially disruptive events.

The specialized computing environment includes a number of hardware security features and data security features that enable competitive organizations to co-analyze proprietary data without revealing the underlying proprietary data to unauthorized users. Proprietary data are stored in volatile memory, which may be automatically erased according to pre-stored criteria. The analysis is performed automatically by a processing unit without human intervention. Analytical results are sanitized (e.g., using data masking) to prevent the analytical result from being tracible to any particular data source or data type. Sanitized analytical results are output without outputting the underlying proprietary data (except to users authorized to validate analytical results).

The computing environment is enclosed within a secure enclosure (e.g., a steel box with a lock that has been hardened against electromagnetic emissions), does not include any peripheral devices outside the secure enclosure, does not communicate wirelessly, and does not have hardware ports accessible from outside the secure enclosure (except, in some embodiments, a wired connection for a web server).

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments, wherein.

DETAILED DESCRIPTION

Figure 1:
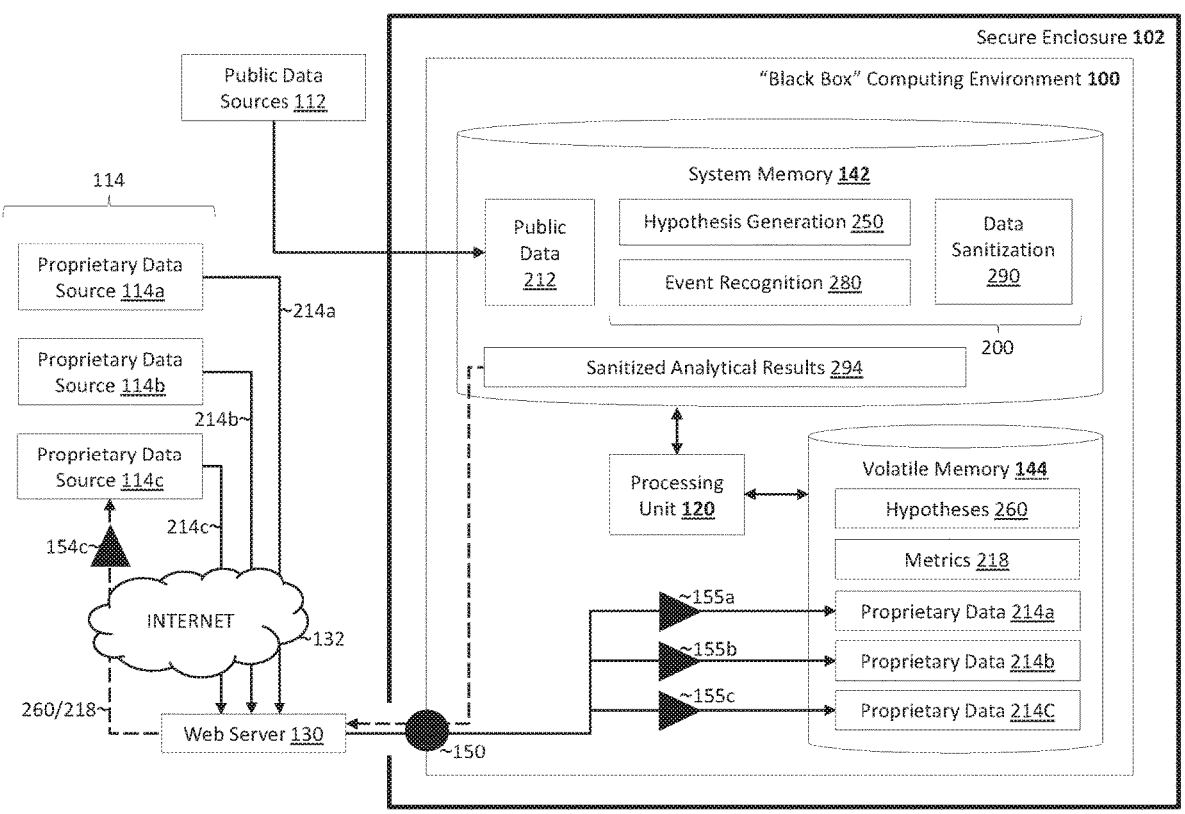
FIG. 1 is a block diagram of a "black box" computing environment according to an exemplary embodiment of the present invention.

Reference to the drawings illustrating various views of exemplary embodiments is now made. In the drawings and the description of the drawings herein, certain terminology is used for convenience only and is not to be taken as limiting the embodiments of the present invention. Furthermore, in the drawings and the description below, like numerals indicate like elements throughout.

FIG. 1 is a block diagram of a "black box" computing environment 100 that stores and executes a co-analysis system 200 according to an exemplary embodiment.

As shown in FIG. 1, the computing environment 100 includes a processing unit 120, system memory 142, and volatile memory 144. The non-volatile memory 142 stores public data 212 received from public data sources 112. The non-volatile memory 142 also stores software modules of the co-analysis system 200 (described in detail below), including a hypothesis generation module 250, an event recognition module 280, and a data sanitization module 290. The volatile memory 144 stores proprietary data 214 received from proprietary data sources 114.

The public data sources 112 may include any digital or non-digital data source. The public data 212 may include any collection of available data sets that may be related to a group, a time period, a political campaign, an economic interest, a personal preference, a geographic area, a social class, a past/future event, etc. The public data 212 may include, for example, news articles, emails, metadata, phone records, text messages, account information, social network postings and activities, online comments, purchase orders, blogs, Global Position System (GPS) data, files shared with the public or friends, friend lists in social platforms, etc. The public data 212 may be transferred from one or more data sources 112. Alternatively, the public data 212 may be obtained by scanning newspaper articles, printed reports, archived files, books, personal records, transcripts (obtained, for example, using voice recognition) of audio recordings, transcripts of the audio included in video recordings (e.g., closed captioning), documents (text, audio, etc.) that are in foreign languages that have been translated to a common language (e.g., English), etc. The public data 212 may also include structured data, such as transaction logs, sensor readings, etc. The public data 212 may be stored in its original form or may be re-organized. The public data 212 may be native in digital form (i.e., created digitally) or may have been digitized either with or without enhancement (for example, using the enhancement techniques disclosed in U.S. Pat. Nos. 9,269,126, 9,361,676 and 9,525,802, which are hereby incorporated by reference).

A proprietary data source 114a, 114b, or 114c (collectively, the proprietary data sources 114) may be any individual or organization (e.g., a business, a hospital, a government agency, etc.) that agrees to provide proprietary data 214a, 214b, or 214c (collectively, the proprietary data 214) that will be collectively managed using the "black box" computing environment 100 using a data security processes (described below) that are agreed upon by all of the proprietary data sources 114. While three proprietary data sources 114 are shown in FIG. 1, any number of proprietary data sources 114 may agree to share their proprietary data 214.

The proprietary data 214 may include any information collected or generated by a proprietary data source 114 that may be co-analyzed, for example to generate a hypotheses 260 (described below) or which may be used to construct a numerical metric 218 (described below) indicative of a socially disruptive event, etc. The proprietary data 214 may include any collection of available data sets that may be related to a group, a time period, a political campaign, an economic interest, an organizational preference, a geographic area, a social class, a past/future event, etc. For example, the proprietary data 214 may include health care transaction data, health care clinical data, environmental sampling data from healthcare institutions, healthcare cost data, microbiological testing of foods or ingredients, financial data, purchasing data, online consumer behavior, supplier data, supply chain data, scheduling and logistic data, the sources, availability, and/or prices of commodities, raw materials, products, services, labor, etc. Unlike the public data 212, which can include structured and unstructured data, the data security features of the system 200 (described below) require that the proprietary data 214 be well specified in terms of type, structure, and format.

The processing unit 120 may include any hardware computer processor(s) capable of performing the software functions described herein. For example, the processing unit 120 may include a metal-oxide-semiconductor (MOS) integrated circuit (IC) chip. The processing unit 120 includes interfaces that enable the processing unit 120 to read data from and store data on the non-volatile memory 142 and the volatile memory 144. If the processing unit 120 includes on-chip memory, that on-chip memory is volatile memory for the data security reasons described below.

The system memory 142 may be any non-transitory computer readable storage medium. In a preferred embodiment, the system memory 142 is non-volatile memory that—in contrast to the volatile memory 144—can retrieve stored information after having been power cycled. The system memory 142, for example, may include flash memory, read-only memory (ROM), a hard disk, etc.

The volatile memory 144 may include any non-transitory computer-readable storage media that requires power to maintain the stored information. The volatile memory 144 retains its contents while powered on. However, when power to the volatile memory 144 is interrupted, the data stored on the volatile memory is quickly lost. The volatile memory 144 may be, for example, static or dynamic random access memory (RAM).

Additional features shown in FIG. 1 are described in detail below with reference to the hardware security and data security of the "black box" computing environment.

The co-analysis system 200 is described in detail below. Among other features, some of which are disclosed for the first time here, the co-analysis system 200 includes a hypothesis generation module 250 and an event recognition module 280. The hypothesis generation module 250 performs similar functions as the hypothesis generation systems described in U.S. Pat. Appl. No. 2015/0235138 and U.S. Pat. Pub. No. 2016/0358087. Meanwhile, the event recognition module 280 performs similar functions as the event recognition system described in PCT Pat. Appl. No. PCT/US2019/034824. While those systems are uniquely capable of analyzing publicly-available data—or by a single organization to analyze its own proprietary information—those systems were unable to provide a platform for multiple organizations to co-analyze proprietary data 214 from multiple proprietary data sources 114 without revealing the underlying proprietary data 214 to those who are unauthorized to access them. To provide that functionality, the co-analysis system 200 is stored on and executed by the "black box" computing environment 100. The "black box" computing environment 100 provides both hardware security features and data security features, also described below, that enable multiple organizations to co-analyze proprietary data 214 from multiple proprietary data sources 114 without revealing the underlying proprietary data 214 to those who are unauthorized to access them.

Figure 2:
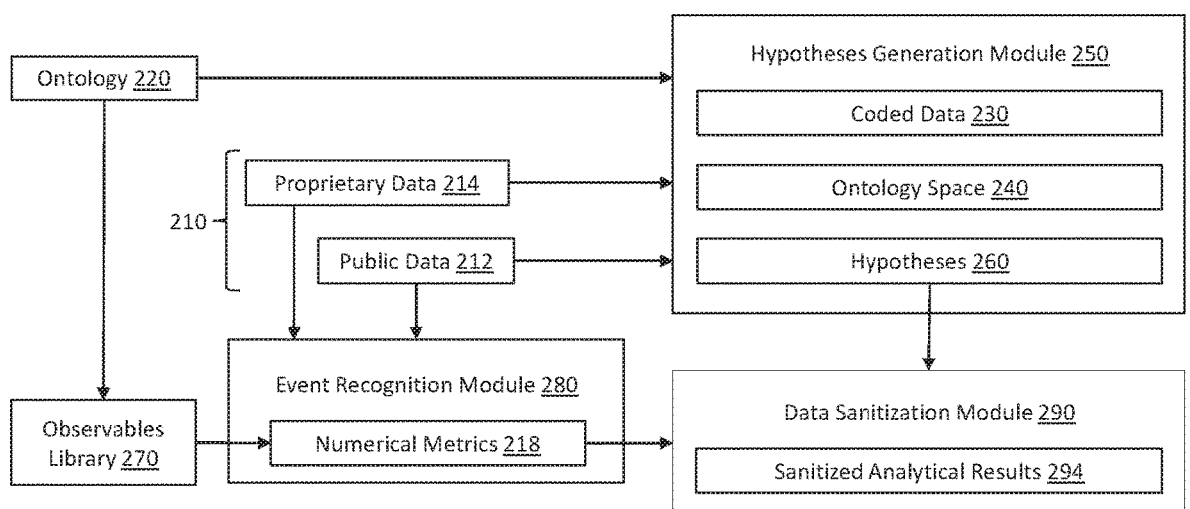
FIG. 2 is a block diagram of software modules of a co-analysis system and the flow of data to and from those software modules according to an exemplary embodiment of the present invention.

FIG. 2 is a block diagram of the software modules of the co-analysis system 200 and the flow of data to and from each of those software modules according to an exemplary embodiment of the present invention.

As shown in FIG. 2, the system 200 may include a hypotheses generation module 250, an event recognition module 280, and a data sanitization module 290. Each of the modules 250 and 280 and 290 may be embodied by software instructions stored on non-transitory media (e.g., the system memory 142) and executed by a hardware computer processor (e.g., the processing unit 120). The system 200 may also include an optional observables library 270 stored on non-transitory media (e.g., the system memory 142).

Proprietary data 214 are received from one or more proprietary data sources 114. Additionally, the public data 212 may be collected from public data sources 112. Similarly, an ontology 220 may be received from a user (e.g., one of the proprietary data sources 114). As described in detail below with reference to FIG. 3, the hypotheses generation module 250 generates hypotheses 260 by generating coded data 230, populating an ontology space 240, and identifying and ranking hypotheses 260 found in the ontology space 240. As described in detail with reference to FIGS. 4-11, the event recognition module 280 extracts numerical metrics 218 from the proprietary data 214 and, optionally, the public data 212 (collectively, the data 210) and plots changes in those numerical metrics 218.

As described below with reference to data security and data sanitization, the data sanitization module 290 sanitizes the analytical results generated by the system 200 (e.g., hypotheses 260 generated by the hypothesis generation module 250, numerical metrics 218 identified by the event recognition module 280, etc.) to form sanitized analytical results 294.

Hypotheses Generation

Figure 3:
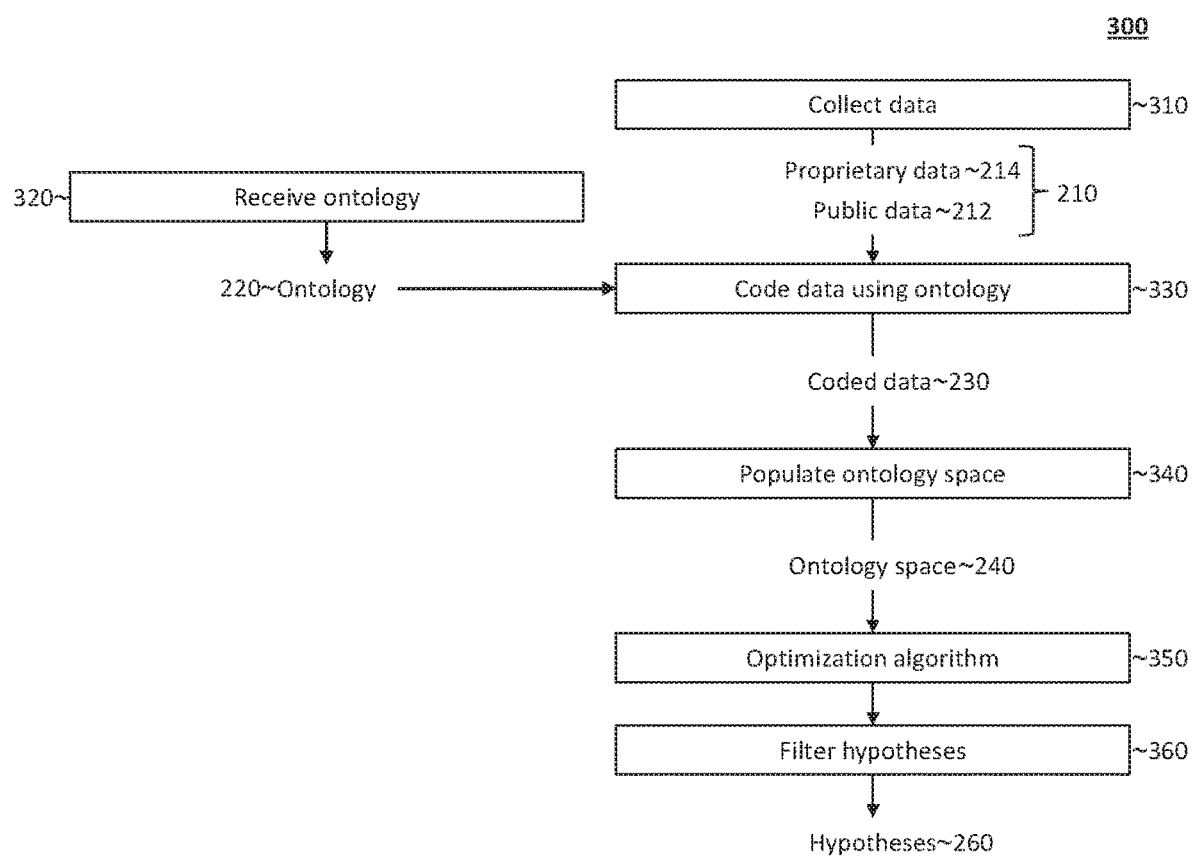
FIG. 3 is a flow chart illustrating a hypotheses generation process according to an exemplary embodiment of the present invention.

FIG. 3 is a flow chart illustrating a hypotheses generation process 300 according to an exemplary embodiment of the present invention. The hypotheses generation process 300 may be performed, for example, by the processing unit 120 executing the hypotheses generation module 250.

The proprietary data 214 are collected from one or more proprietary data sources 114 in step 310. Additionally, public data 212 may be collected from public data sources 112.

The proprietary data 214 and the public data 212 (collectively, the data 210) may be relevant to a particular domain of interest, such as food adulteration. However, the system 200 provides a domain agnostic platform that can utilize any domain-specific or generic data.

Each document in the data 210 may be weighted. While all of the data 210 may be of interest, some of the data 210 may have different associated weights depending on characteristics such as the nature, source of capture, volume, uniqueness, and variance of the data 210. As such, some documents in the data 210 may be treated as being more valuable than others.

An ontology 220 is received in step 320. An ontology 220 is a set of possible event descriptions. That ontology can be understood to represent a formal conceptualization of a particular domain of interests or a definition of an abstract view of a world a user desires to present. Such conceptualization or abstraction is used to provide a complete or comprehensive description of events, interests, or preferences from the perspective of a user who tries to understand and analyze a body of information.

Each ontology 220 includes a number of elements. An ontology 220 with three elements, such as {subject, verb, object} for example, is used to detect all data corresponding to the notion "who did what to whom." A 6-element ontology 220 may include {what, who, where, indicators, actions, consequences}. Each element includes choices of terms for that element of the ontology 220, known as a "vocabulary." If each element in a 6-element ontology 220 has a 100-term vocabulary, for example, then the ontology 220 defines $100^6$ descriptions of distinct, mutually exclusive (although possibly related) events. Accordingly, the ontology 220 constitutes the set of all distinct combinations of hypotheses considered during the hypotheses generation process 300. Each combination of elements in an ontology 220 is referred to as a "vector."

For many vocabulary terms, synonyms exist that refer to the same real-world concept. Accordingly, the ontology 220 may include synonym collections that each correspond to one of the vocabulary terms.

The ontology 220 may be specific to a particular domain, such as a food adulteration. Accordingly, a subject matter expert (SME) preferably vets the ontology 220 to ensure that it accurately represents the domain knowledge of the data 210 under consideration. However, the system 200 provides a domain agnostic platform that can use any number of domain-specific or generic ontologies 220 to analyze any set of data 210. The ontology 220 may be received from a user (e.g., one of the proprietary data sources 114).

The data 210 are coded using the ontology 220 to form coded data 230 at step 330. Specifically, the processing unit 120 executing the hypotheses generation module 250 searches the documents in the data 210 to determine which ontology vectors in the ontology 220 appear in the data 210. For example, an analysis of reports on political violence using a 3-element {subject, verb, object} ontology 220 may identify the following ontology vectors representing the following hypotheses:

1. Terrorists sabotage canned food factory.
2. ISIS opens valve at peach canning factory.
3. Maintenance finds malfunctioning valve in peach canning factory.

Each set of ontology vectors may represent a hypothesis. Each hypothesis may represent an indicator (e.g., a leading indicator) of an event occurring at a (known, suspected, or unknown) place on the globe. The event may be a socially disruptive event, for example an emerging threat, a biological event involving humans, a biological event involving animals, a biological event involving plants, a political event, a socioeconomic event, an economic event, an industrial event, an infrastructure event, an environmental event, civil unrest, dislocation, riots, violence against property, violence against people, a cybersecurity event, events impacting food and water security, proliferation of weapons of mass destruction, improvised explosive devices, human trafficking, narcotics, public opinion about a political topic, public opinion about public policy, public opinion about religion, public opinion about entertainment, a natural disaster, natural disaster aftermath, natural resource exploitation, military activity, etc. A socially disruptive event may also include, for example, pressure could that leads people or groups to commit crimes or deviate from operating procedures.

Accordingly, the processing unit 120 executing the hypotheses generation module 250 assigns vectors from the ontology 220 to corresponding elements of text in the data 210 to form the coded data 230. The processing unit 120 executing the hypotheses generation module 250 may code the documents in the data 210 using one or more entity extraction schemes that are known in the art.

The ontology 220 can be graphically represented as an ontology space 240, for example with as many dimensions as there are elements in the ontology 220. The ontological vectors identified in the data 210 form an ontology space 240 at step 340. A one-element ontology 220, for example, forms an ontology space 240 with only one dimension (i.e., a line), which is readily understandable by a human analyst. Each point along the line represents a vocabulary term in the ontology 220. It can be imagined that each time a vocabulary term is identified in the data 210, a bar graph at that point along the line gets higher (or lower). The vocabulary terms found most often in the data 210 are represented by the highest peaks (or lowest troughs) along the one-dimensional ontology space 240. Two-element and three-element ontologies 220 may form two-dimensional and three-dimensional ontology spaces 240, which are more complicated but may still be visualized and comprehended by an analyst. However, when the ontology 220 has more than three elements and forms a 4-dimensional, 5-dimensional, or even 100-dimensional ontology space 240, the ontology space 240 becomes so complex that no human analyst could ever intuitively understand it.

Regions of the ontology space 240 are populated as the documents in the data 210 are coded. The populated ontology space 240 is a geometric representation of possible events that are encoded by that particular corpus of data 210 according to that particular ontology 220. The vectors identified in the data 210, which are assigned to the corresponding coordinates in the ontology space 240, form structures in the ontology space 240. In particular, points in the ontology space 240 that are populated by successive occurrences in the data 210 are assigned a value corresponding to a larger weight (described above as a higher peak or lower trough) than points in the ontology space 240 that are found less often in the data 210. When all documents are coded, the ontology space 240 is populated by clusters (i.e., neighborhoods of points) of differing weights. The clusters of points of highest weight in the ontology space 240 correspond to the most likely hypotheses of what the data 210 are describing.

As described above, an ontology 220 with N elements may be depicted graphically in an N-dimensional ontology space 240, where each dimension of the N-dimensional ontology space 240 represents one of the N elements of the ontology 220. In other embodiments, however, the hypotheses generation module 250 may perform dimension reduction such that the ontology space 240 has fewer dimensions than the number of elements in the ontology. For example, the hypotheses generation module 250 can separate the N elements of the ontology 220 into R groups and then depict them graphically in the coded data 230 in an R-dimensional ontology space 240.

The hypotheses generation module 250 may also group or merge ontology vectors describing similar or related concepts into neighborhoods in the ontology space 240. For example, the hypotheses generation module 250 may identify ontology vectors that describe similar or related concepts—for example, {group, bombed, bunker} and {group, exploded, bunker}—that are not distinct events based on security interests. If the ontology 220 is ordered, meaning similar or related choices for each ontology element appear in order, the similar or related ontology vectors in the coded data will appear close together in the ontology space 240. Accordingly, the hypotheses generation module 250 may merge ontology vectors using clustering techniques that are known in the art, such as hierarchies, filters/thresholds, topic models, conditional random fields, etc.

An optimization algorithm identifies and ranks hypotheses 260 at step 350. The processing unit 120 executing the hypotheses generation module 250 identifies and ranks the hypotheses 260 by identifying the clusters of highest weights in the ontology space 240. Identifying this set of clusters in the ontology space 240 is not a trivial problem for ontologies 220 of significant size and structure. However, it is a moderately well-defined optimization problem that can be solved using optimization algorithms such as simulated annealing, a Monte Carlo-based algorithm, genetic algorithm, etc.

Simulated annealing, for example, identifies the highest weighted clusters in an efficient and robust manner by selecting a random point in the ontology space 240 and letting simulated annealing govern a random "walk" through the weighted ontology space 240 via a large number of heat-cooling cycles. The processing unit 120 executing the hypotheses generation module 250 builds up an ensemble of such cycles for a large number of randomly-chosen initial points. An accounting of the most highly weighted regions in the weighted ontology space 240 then corresponds to a ranked list of the hypotheses 260 that potentially explain the material in the data 210, which may be presented to an analyst to test. In another example, the ontology space 240 can graphically depict populations and a genetic algorithm can be used to identify and rank the highest weighted ontology vectors or neighborhoods in terms of fitness of population.

Optionally, the hypotheses 260 are filtered at step 360 to generate a set of ranked relevant hypotheses 260.

Trivial hypotheses (such as tautologies) and/or nonsensical hypotheses may be discarded. A hypothesis 260 that only contains frequent words, for example, is most likely too general to be of interest. Meanwhile, a hypothesis 260 containing the action "consumer eats delivery truck laced with poison" would be nonsensical and would also be discarded. By contrast, "consumer eats strawberries laced with poison" is of interest. Similarly, the specificity of "consumer eats strawberries laced with poison" is more interesting (and actionable) than "consumer eats produce laced with poison". The processing unit 120 executing the hypotheses generation module 250 may use techniques from information retrieval and natural language procession (e.g., term frequency, scope and synonym analysis, etc.) to discard trial and/or nonsensical hypotheses.

Local minima effects can sometimes provide a solution even when a better solution exists in another neighborhood. Random variations or mutations in the optimization algorithm (e.g., simulated annealing or genetic process) can be used to prevent the incorrect determination of a desired solution (e.g., a hypothesis of limited value) due to local minima effects. Those variations or mutations may be guided. At each proposed mutation, the neighborhood can be assessed for fitness. In an annealing process, for example, fitness can be assessed by the rate of change (e.g., the slope of descent or accent). In a genetic process, the fitness of a population member can be computed. In either process, a mutation can be rejected if the mutation results in a hypothesis space that is deemed highly anticipated. Additionally, the rate of mutation can be modified to be a function of the anticipation level of the neighborhood initially in (e.g., a nonlinear mapping, a simple proportional dependence, etc.). Still further, the level of anticipation can be based on the profile of the analyst receiving the hypotheses.

The system 200 may also provide functionality for users to filter results according to topics of interest. For example, if the user is concerned with developing hypotheses related to strawberries (as opposed to cardboard boxes, for example), then the processing unit 120 executing the hypotheses generation module 250 provides functionality to exclude hypotheses that are not related to strawberries or materials in the farm-to-fork pathway related to strawberry growth, production, and delivery. Specifically, the hypotheses generation module 250 may identify regions of the ontology space 240 that include ontology element choices that are of interest to the user (e.g., strawberries). Ontology vectors or neighborhoods that are not located within the ontology space 240 near the area of interest of the user may be filtered out as uninteresting to the user. Conversely, ontology vectors or neighborhoods squarely within the region of interest of the user may actually be trivial to the user. In additional to functionality for a user to specify a topic of interest, the system 200 may provide functionality to automatically determine topics of interest, for example based on previous hypotheses, the user's role (individually or as a group), topic models, or other information retrieval approaches known in the art.

The hypotheses generation module 250 may determine and output a degree of certainty as to the likelihood of each generated hypothesis 260. The degree of certainty as to the likelihood of each generated hypothesis 260 is related to the confidence in—and support for—each generated hypothesis 260. The hypotheses generation module 250 may determine a degree of certainty for each hypothesis 260 based on (e.g., proportional to) the weight ontology vector or neighborhood associated with that hypothesis 260, which is based on (e.g., proportional to) the number of documents within the data 210 (and the weight of those documents) that, when coded, are found to contain the ontology vector or an ontology vector within that neighborhood. Outputting a degree of certainty for each generated hypothesis 260 is particularly useful for proprietary data sources 114 using the "black box" computing environment 100, because the computing environment 100 generally prevents those proprietary data sources 114 from viewing the underlying proprietary data 214 supporting those hypotheses 260.

As shown in FIG. 2 and described in detail below, the hypotheses generation module 250 outputs the hypotheses 260 to the data sanitization module 290 (described below).

Event Recognition

In addition to identifying hypotheses 260 that users may not have previously considered, the system 200 also includes an event recognition module 280 that enables human and/or machine event recognition.

The event recognition module 280 analyzes documents from the proprietary data 214 and, optionally, the public data 212 (collectively, the data 210) and constructs one or more numerical metrics 218 using text analytic and other methods.

The metrics 218 may include, for example, the frequency of keywords in time-stamped documents, the change in sentiment or emotions expressed in time-stamped documents, the occurrence of ontological terms from a user-supplied ontology, evolution of topics in the data 210, etc. In the aggregate, these and related metrics 218 comprise temporal and/or spatial signals that, when combined, define signatures of events of interest.

An event of interest may be an event occurring at a (known, suspected, or unknown) place on the globe. An event of interest be a socially disruptive event, for example an emerging threat, a biological event involving humans, a biological event involving animals, a biological event involving plants, a political event, a socioeconomic event, an economic event, an industrial event, an infrastructure event, an environmental event, civil unrest, dislocation, riots, violence against property, violence against people, a cybersecurity event, events impacting food and water security, proliferation of weapons of mass destruction, improvised explosive devices, human trafficking, narcotics, public opinion about a political topic, public opinion about public policy, public opinion about religion, public opinion about entertainment, a natural disaster, natural disaster aftermath, natural resource exploitation, military activity, etc. A socially disruptive event may also include, for example, pressure could that leads people or groups to commit crimes or deviate from operating procedures.

Frequency of keywords: The user may supply a list of keywords of interest (e.g., strawberries, Costa Rica, rainfall, flooding). The event recognition module 280 may then search for and count the numbers of each keyword (or combinations of keywords) per unit of time (e.g., hour, day, week, etc.), detect sudden changes in the occurrence of those keywords per unit time, count the occurrence of those keywords in publications from or focused on particular geographic regions, identify named places associated with those keywords, etc.

Change in sentiment and emotions: A user may be interested in changes in the sentiment or emotion expressed in documents reviewing or describing a particular product. For example, a sudden change in the sentiment regarding strawberries from Costa Rica from positive or neutral to negative may indicate changes in consumer satisfaction. The product may be making people sick or may be moldy or smell odd. Accordingly, the event recognition module 280 may compute the sentiment of documents containing terms of interest (e.g., user-supplied keywords, ontology terms) per unit of time and identify named places associated with sentiments.

Occurrence of terms from an ontology 220: As described above, an ontology 220 is a specification of related facts encapsulating knowledge about a given domain (for example, food integrity). Automated identification of terms in the ontology 220 may lead to recognizing information that may be otherwise missed if documents are reviewed manually. Accordingly, the event recognition module 280 may search for and count the occurrences of each ontology term, or combinations of terms, per unit of time (e.g., hour, day, week, etc.) and identify named places associated with those terms.

Evolution of topics: The emergence of documents clustered in time or in a specific geographic area and expressing themes related to a particular domain of interest (e.g., food safety issues) may be a direct indicator of an event of interest. Accordingly, the event recognition module 280 may compute themes and evaluate the distributions of themes in time and space.

The event recognition module 280 analyzes the documents in the data 210 to determine a baseline for each metric 218 (or aggregates of the metrics 218). Deviations from those baselines may be indicative of an event of interest in a particular domain (e.g., food integrity). Accordingly, the event recognition module 280 may identify deviations from those baselines and outputs information indicative of those deviations (e.g., an alert) for the user. Any metric(s) 218, deviations from baselines, and/or alerts generated by the event recognition module 280 for a user are output by the event recognition module 280 to the data sanitization module 290 (described below).

Figure 4:
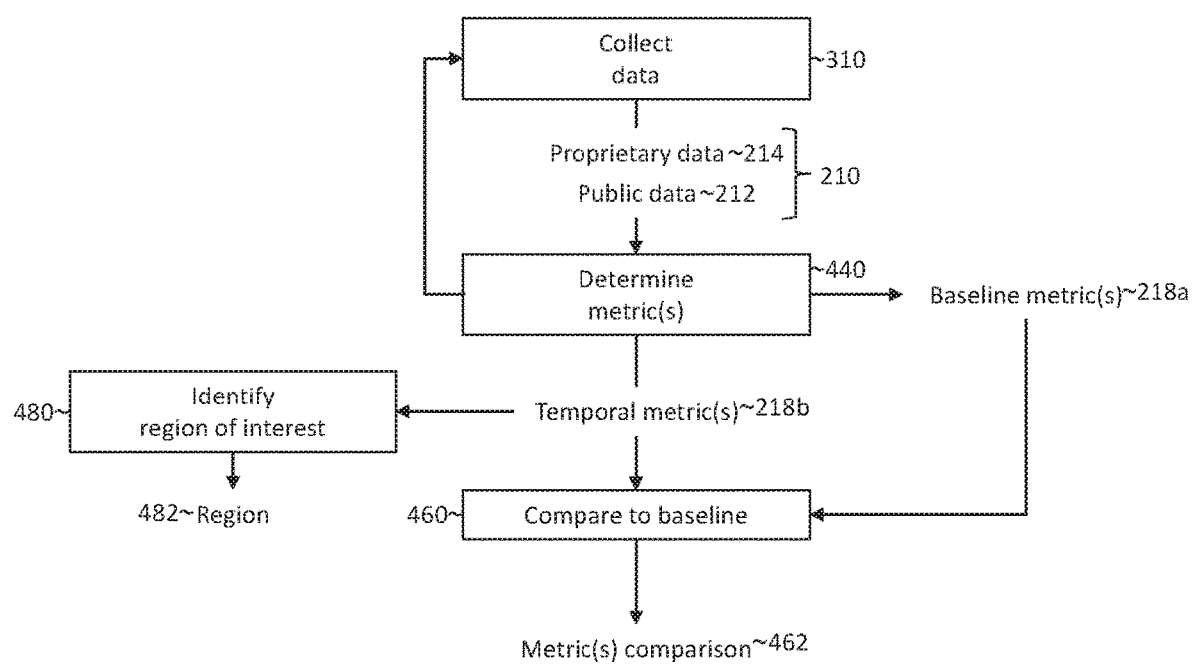
FIG. 4 is a flowchart illustrating an event recognition process according to an exemplary embodiment of the present invention.

FIG. 4 is a flowchart illustrating an event recognition process 400 according to an exemplary embodiment of the present invention. The event recognition process 400 may be performed, for example, by the processing unit 120 executing the event recognition module 280.

The proprietary data 214 and, optionally, the public data 212 (collectively, the data 210) are collected in step 310. Just like the data collection step 310 of the hypotheses generation process 300, the data 210 may be relevant to a particular domain of interest (such as food adulteration). However, the system 200 provides a domain agnostic platform that can utilize any domain-specific or generic data.

Documents in the data 210 are analyzed to determine one or more metrics 218 in step 440. One or more baseline metrics 218*a* are constructed based on documents initially collected in step 310. Because steps 310 and 440 are recursive processes, step 310 is then repeated so that updated data 210 may be collected over time, and step 440 is repeated so that the same metric(s) (temporal metric(s) 218*b*) are determined as updated data 210 are collected over time. (Collectively, the baseline metric(s) 218*a* and the temporal metric(s) 218*b* are referred to as numerical metrics 218.)

In step 460, the temporal metrics 218*b* are compared to the baseline metrics 218*a* to determine changes in the temporal metrics 218*b* relative to the baseline metrics 218*a* (the metric(s) comparison 462). The event recognition module 280 may output the metric(s) comparison 462 to the user (e.g., graphically as described below). Additionally or alternatively, the event recognition module 280 may generate and output an alert for a user in response to a determination that the metric(s) comparison 462 meets or exceeds a predetermined threshold.

A region of interest 482 may be identified in step 480. For example, the event recognition module 280 may determine that the temporal metric(s) 218b that exceed the baseline metrics 218a were found in publications from or focused on particular geographic regions. Additionally or alternatively, the event recognition module 280 may identify named places in the documents where the temporal metric(s) 218b exceed the baseline metrics 218a using an entity extraction scheme. In those instances, the event recognition module 280 may output the region of interest 482 to the user, together with the metric(s) comparison 462 or the alert generated based on the metric(s) comparison 462.

Any metric(s) comparison 462, alert generated based on a metric(s) comparison 462, and/or the region of interest 482 generated for the user by the event recognition module 280 is output by the event recognition module 280 to the data sanitization module 290 (described below).

FIG. 4 describes the generic event recognition process 400 for identifying changes in any metric 218 found in the data 210. FIGS. 5-8 describe specific processes 500-800 in which the metric is keyword frequency, sentiment, frequency of ontological terms, or evolution of topics.

Figure 5:
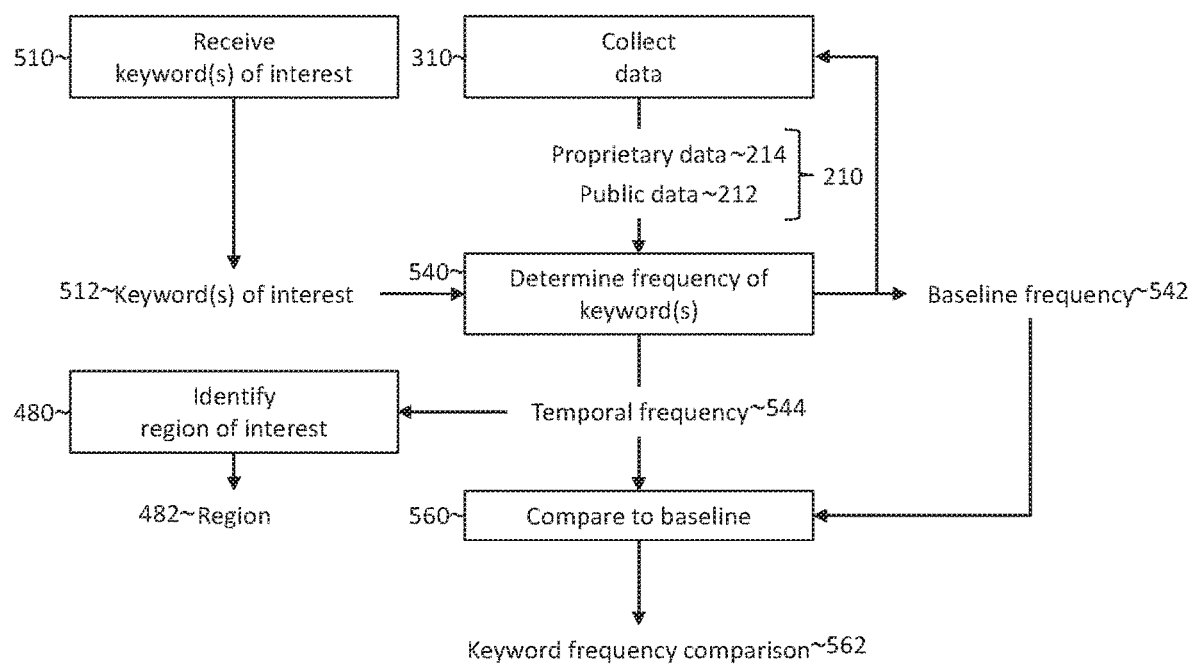
FIG. 5 is a flowchart illustrating a keyword frequency recognition process according to an exemplary embodiment of the present invention.

FIG. 5 is a flowchart illustrating a keyword frequency recognition process 500 (that may be performed, for example, by the processing unit 120 executing the event recognition module 280) according to an exemplary embodiment of the present invention.

The proprietary data 214 and, optionally, the public data 214 (collectively, the data 210) are collected in step 310. Again, while the system 200 provides a domain agnostic platform that can utilize any domain-specific or generic data 210, the data 210 may be relevant to a particular domain of interest (such as food adulteration).

One or more keywords of interest 512 are received from a user in step 510.

Documents in the data 210 are analyzed to determine the baseline frequency 542 of the one or more keywords 512 in step 540. Again, steps 310 and 540 are recursive processes, meaning that updated data 210 may be collected over time and the temporal frequency 544 of the keyword(s) 512 are determined over time. The event recognition module 280 may determine the baseline frequency 542 and the temporal frequency 544 of the keyword(s) 512 using an entity extraction scheme.

In step 560, the temporal frequency 544 is compared to the baseline frequency 542 to determine changes in the temporal frequency 544 of the keyword(s) 512 relative to the baseline frequency 542 of those keyword(s) 512 (the keyword frequency comparison 562). The event recognition module 280 may output the keyword frequency comparison 562 to the user (e.g., graphically) as described below. Additionally or alternatively, the event recognition module 280 may generate and output an alert for a user in response to a determination that the keyword frequency comparison 562 meets or exceeds a predetermined threshold.

Again, a region of interest 482 may be identified in step 480. Specifically, the event recognition module 280 may determine that documents in the data 210 where the temporal frequency 544 of the keyword(s) 512 exceed the baseline frequency 542 of those keyword(s) 512 were found in publications from or focused on particular geographic regions. Additionally or alternatively, the event recognition module 280 may identify named places in the documents where the temporal frequency 544 of the keyword(s) 512 exceed the baseline frequency 542 of those keyword(s) 512 using an entity extraction scheme. In those instances, the event recognition module 280 may output the region of interest 482 to the user, together with the keyword frequency comparison 562 or the alert generated based on the keyword frequency comparison 562.

Any keyword frequency comparison 562, alert based on a keywork frequency comparison 562, and/or region of interest 482 generated for the user by the event recognition module 280 is output by the event recognition module 280 to the data sanitization module 290 (described below).

Figure 6:
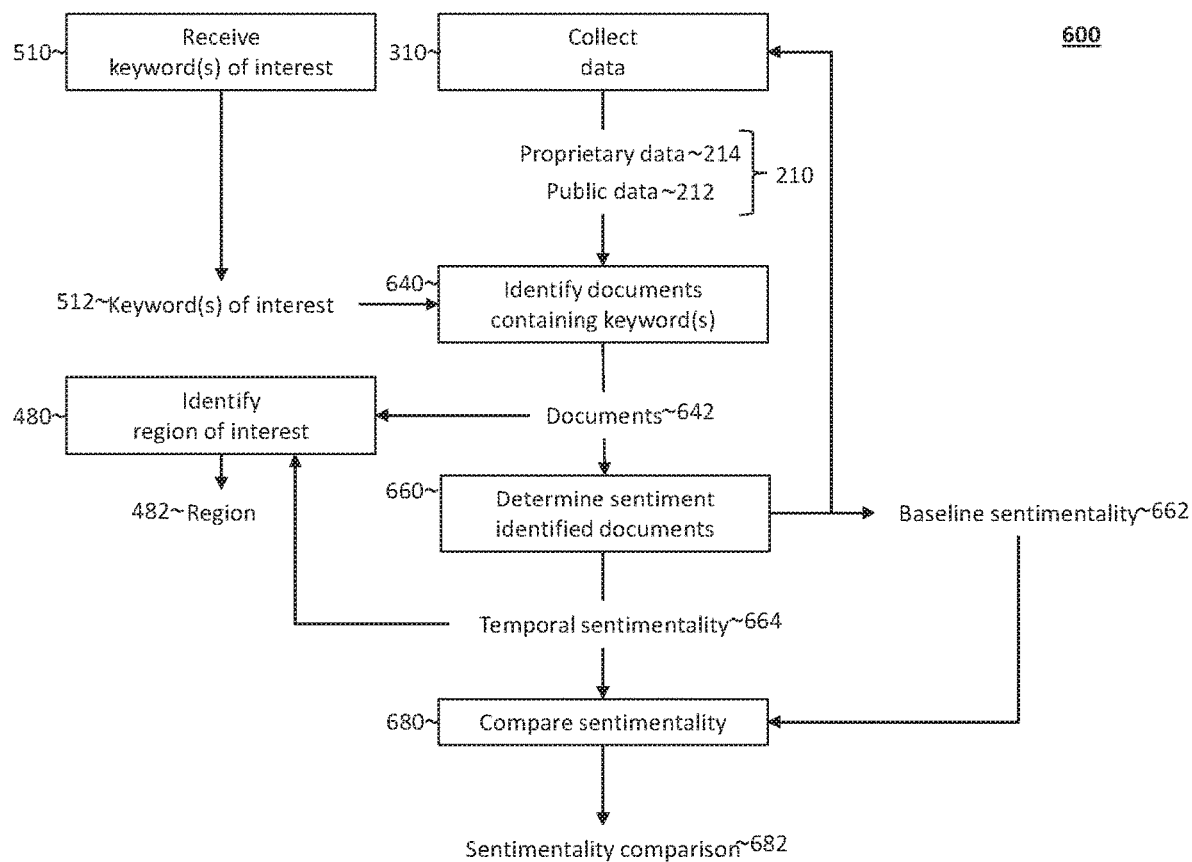
FIG. 6 is a flowchart illustrating a sentimentality recognition process according to an exemplary embodiment of the present invention.

FIG. 6 is a flowchart illustrating a sentimentality recognition process 600 (that may be performed, for example, by the processing unit 120 executing the event recognition module 280) according to an exemplary embodiment of the present invention.

One or more keywords of interest 512 are received from a user in step 510.

The proprietary data 214 and, optionally, the public data 212 (collectively, the data 210) are collected in step 310. Again, while the system 200 provides a domain agnostic platform that can utilize any domain-specific or generic data 210, the data 210 may be relevant to a particular domain of interest (such as food adulteration).

Documents in the data 210 are analyzed in step 640 to identify the documents 642 containing the keyword(s) of interest 512 (e.g., using an entity extraction scheme).

A baseline sentimentality 662 (the sentiments expressed in the documents 642 containing the keyword(s) 512) is determined in step 660. Again, steps 310, 640, and 660 are recursive so that additional data 210 may be collected, additional documents 642 may be identified, and the temporal sentimentality 664 of the documents 642 containing the keyword(s) 512 may be determined over time. The event recognition module 280 may use any of the existing sentiment analysis methods in the art to determine baseline sentimentality 662 and the temporal sentimentality 664 of the documents 642 containing the keyword(s) 512.

In step 680, the temporal sentimentality 664 is compared to the baseline sentimentality 662 to determine changes in the temporal sentimentality 664 of the documents 642 containing the keyword(s) 512 relative to the baseline sentimentality 662 of those documents 642 (the sentimentality comparison 682). The event recognition module 280 may output the sentimentality comparison 682 to the user (e.g., graphically) as described below. Additionally or alternatively, the event recognition module 280 may generate and output an alert for a user in response to a determination that the sentimentality comparison 682 meets or exceeds a predetermined threshold.

In step 480, a region of interest 482 may be identified in the documents 642 that contain the keyword(s) 512 or the where the temporal sentimentality 644 meets or exceeds a predetermined threshold (e.g., where "fear" is more common than "anticipation"). Specifically, the event recognition module 280 may determine that the documents 642 were found in publications from or focused on particular geographic regions and/or identify named places in the documents 642. The event recognition module 280 may output the region of interest 482 to the user, together with the sentimentality comparison 682 or the alert generated based on the sentimentality comparison 682.

Any sentimentality comparison 682, alert generated by a sentimentality comparison 682, and/or the region of interest 482 generated for the user by the event recognition module 280 is output by the event recognition module 280 to the data sanitization module 290 (described below).

Figure 7:
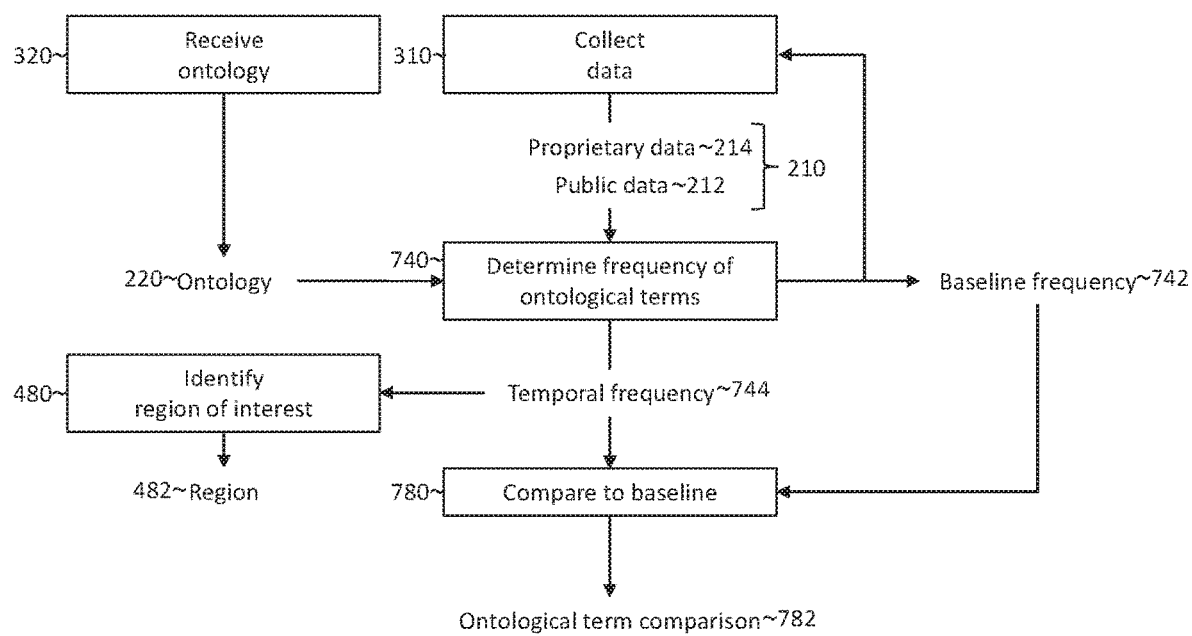
FIG. 7 is a flowchart illustrating an ontological term recognition process according to an exemplary embodiment of the present invention.

FIG. 7 is a flowchart illustrating an ontological term recognition process 700 (that may be performed, for example, by the processing unit 120 executing the event recognition module 280) according to an exemplary embodiment of the present invention.

An ontology 220 is received, for exampling using the same process 320 of the hypotheses generation process 300 described above.

The proprietary data 214 and, optionally, the public data 212 (collectively, the data 210) are collected in step 310. Again, while the system 200 provides a domain agnostic platform that can utilize any domain-specific or generic data 210, the data 210 may be relevant to a particular domain of interest (such as food adulteration).

Documents in the data 210 are analyzed to determine the baseline frequency 742 of terms from the ontology 220 (e.g., using an entity extraction scheme) in step 740. The event recognition module 280 may search for all of the terms of the ontology 220 or, more specifically, the recognition module 280 may search for the ontological terms included in the highly-ranked hypotheses 260 identified using the hypothesis generation process 300. Again, steps 310 and 740 are recursive processes, meaning that updated data 210 may be collected and the temporal frequency 744 of terms from the ontology 220 may be determined over time.

In step 760, the temporal frequency 744 is compared to the baseline frequency 742 to determine changes in the temporal frequency 744 relative to the baseline frequency 742 of the terms from the ontology 220 (the ontological term comparison 782). The event recognition module 280 may output the ontological term comparison 782 to the user (e.g., graphically) as described below. Additionally or alternatively, the event recognition module 280 may generate and output an alert for a user in response to a determination that the ontological term comparison 782 meets or exceeds a predetermined threshold.

Again, a region of interest 482 may be identified in step 480. Specifically, the event recognition module 280 may determine that documents in the data 210 where the temporal frequency 744 of the terms from the ontology 220 exceed the baseline frequency 742 were found in publications from or focused on particular geographic regions. Additionally or alternatively, the event recognition module 280 may identify named places in the documents where the temporal frequency 744 exceeds the baseline frequency 742 using an entity extraction scheme. In those instances, the event recognition module 280 may output the region of interest 482 to the user, together with the ontological term comparison 782 or the alert generated based on the ontological term comparison 782.

Any ontological term comparison 782, alert generated in response to an ontological term comparison 782, and/or the region of interest 482 generated for the user by the event recognition module 280 is output by the event recognition module 280 to the data sanitization module 290 (described below).

Figure 8:
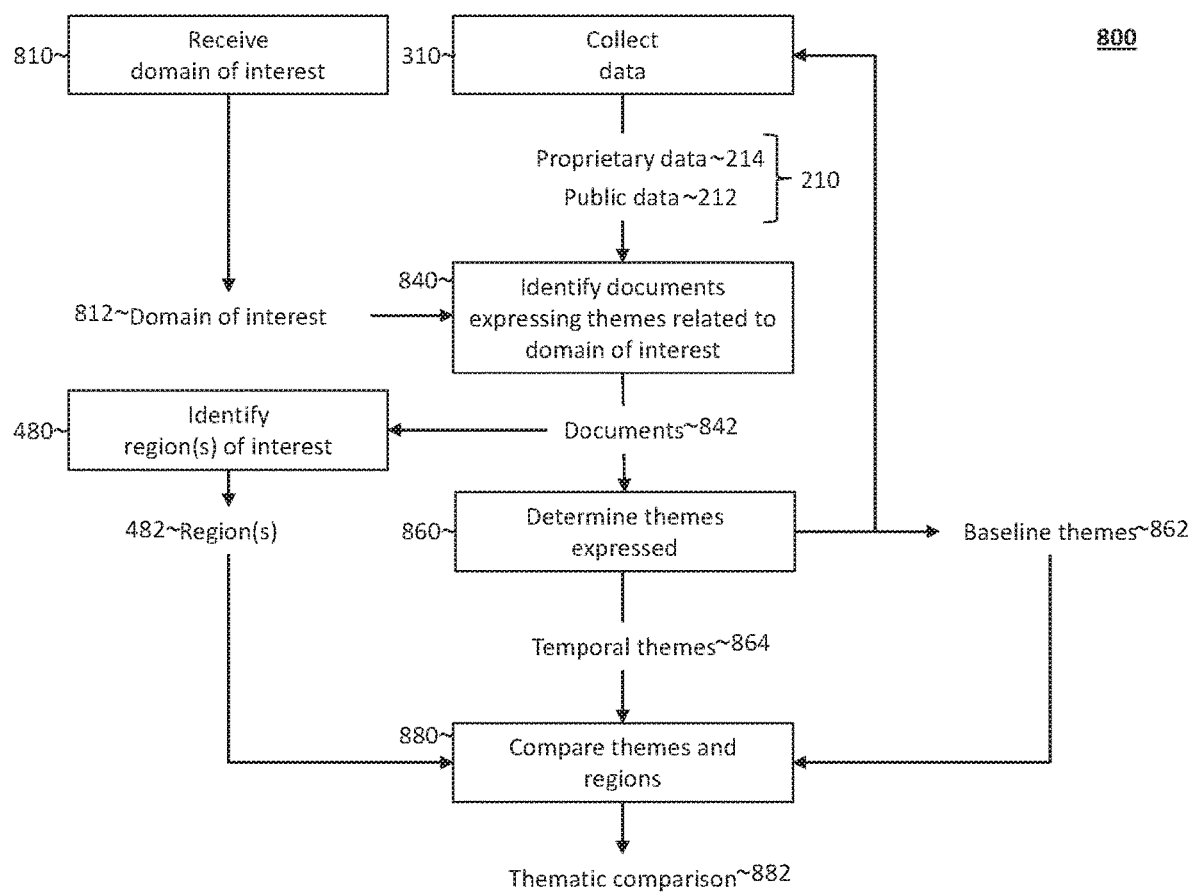
FIG. 8 is a flowchart illustrating a thematic recognition process according to an exemplary embodiment of the present invention.

FIG. 8 is a flowchart illustrating a thematic recognition process 800 (that may be performed, for example, by the processing unit 120 executing the event recognition module 280) according to an exemplary embodiment of the present invention.

A domain of interest 812 is received from a user in step 810. The proprietary data 214 and, optionally, the public data 214 (collectively, the data 210) are collected in step 310.

Documents in the data 210 are analyzed in step 840 to identify the documents 842 expressing themes related to the domain of interest 812. For example, the event recognition module 280 may utilize any of the many topic models known in the art to identify, such as Latent Dirichlet Allocation (LDA), probabilistic latent semantic analysis (PLSA), etc.

In step 860, the themes expressed in the documents 842 are identified to determine the baseline themes 862 expressed in the documents 842 related to the domain of interest 812. Again, steps 310, 840, and 860 are recursive so that additional data 210 may be collected, additional documents 842 may be identified, and the temporal themes 864 in the documents 842 may be determined over time.

In step 480, a region of interest 482 may be identified in the documents 842 (e.g., by determining if the documents 842 are from or focused on particular geographic regions and/or include named places).

In step 880, the temporal themes 864 are compared to the baseline themes 862 and the regions of interest 482 are compared over time (the thematic comparison 882).

The event recognition module 280 may output the thematic comparison 882 (and region(s) of interest 482) to the user (e.g., graphically) as described below and/or may generate and output an alert for a user in response to a determination that the thematic comparison 882 meets or exceeds a predetermined threshold.

Any thematic comparison 882, alert generated in response to a thematic comparison 882, and/or the region of interest 482 generated for the user by the event recognition module 280 is output by the event recognition module 280 to the data sanitization module 290 (described below).

As described above and shown below, the event recognition module 580 may output (or generate an alert based on) multiple metrics comparisons 462, including one or more keyword frequency comparisons 562, sentimentality comparisons 682, ontological term comparisons 782, and/or thematic comparisons 882.

Figure 9A:
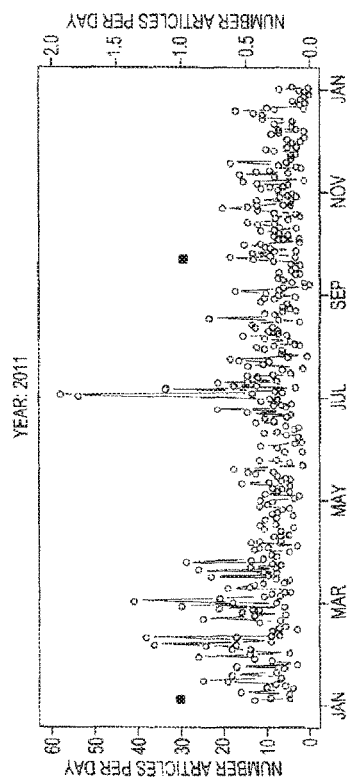
FIGS. 9A, 9B, and 9C are graphs illustrating baseline signals according to an exemplary embodiment of the present invention.
Figure 9B:
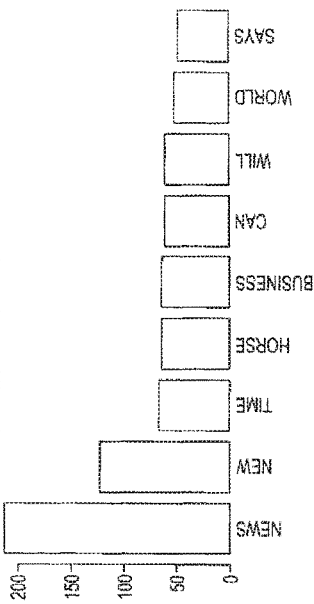
Figure 9C:
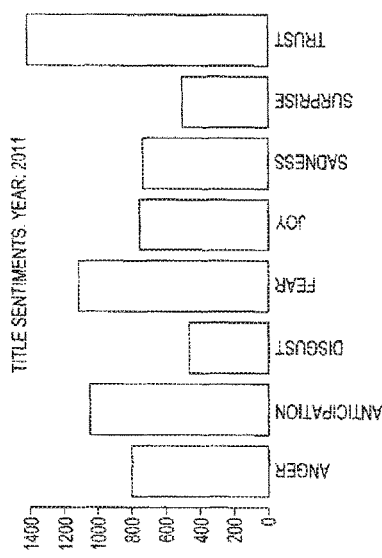

FIGS. 9A, 9B, and 9C are graphs illustrating baseline metrics 218a according to an exemplary embodiment of the present invention. FIG. 9A shows the number of articles per day (circles, left axis) and the number of articles relevant to an analyst looking for evidence of horsemeat substitution (squares, right axis) in 2011. FIG. 9B shows the top title word frequencies of the articles identified from 2011. FIG. 9C shows the top title sentiments of the articles identified from 2011.

Figure 10A:
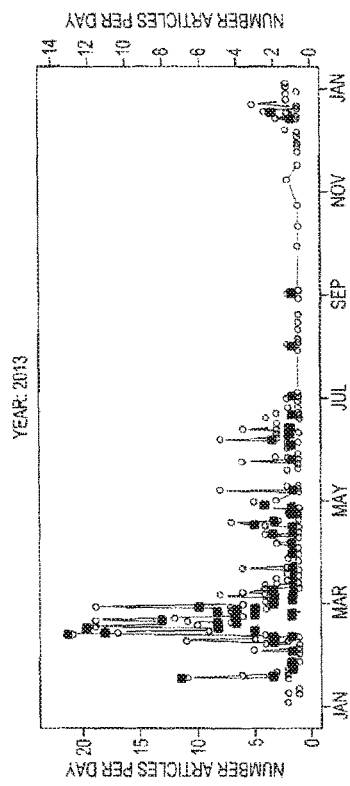
FIGS. 10A, 10B, and 10C are graphs illustrating signals according to an exemplary embodiment of the present invention.
Figure 10B:
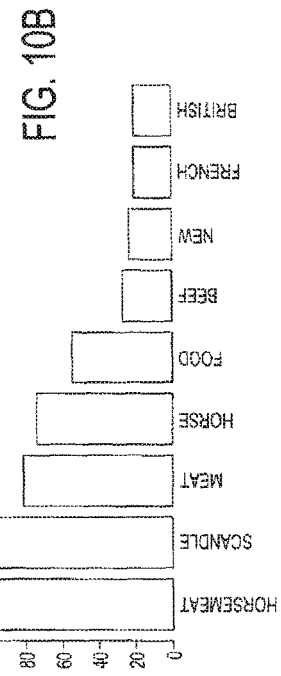
Figure 10C:
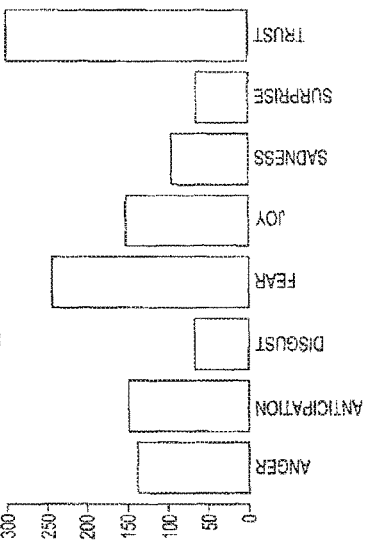

FIGS. 10A, 10B, and 10C are graphs showing temporal metrics 218b according to an exemplary embodiment of the present invention. FIG. 10A shows the number of articles per day (circles, left axis) and the number of articles relevant to an analyst looking for evidence of horsemeat substitution (squares, right axis) in 2013. FIG. 10B shows the top title word frequencies of the articles from 2013. FIG. 10C shows the top title sentiments of the articles identified from 2013.

The baseline metrics 218a shown in FIGS. 9A, 9B, and 9C and the temporal metrics 218b shown in FIGS. 10A, 10B, and 10C were generated solely based on public data 212. However, as one of ordinary skill in the art may recognize, comparisons of metrics 218 generated based on proprietary data 214 may be output via a similar graphical user interface.

As shown in FIG. 9A, only two relevant articles were identified in 2011. The rapid increases in the total number of articles per date was not correlated with occurrence of relevant articles. As shown in FIG. 9B, the most frequent words were not indicative of horsemeat incident. Regarding emotionality, "anticipation" was about as common as "fear" as shown in FIG. 9C. By contrast, in FIG. 10A, many relevant articles were identified in 2013. Persistent increases in the total number of articles per date appear to be correlated with occurrence of relevant articles. As shown in FIG. 10B, the most frequent words appear indicative of a horsemeat incident. Regarding emotionality, "fear" was much more common than "anticipation" as shown in FIG. 10C.

Figure 11:
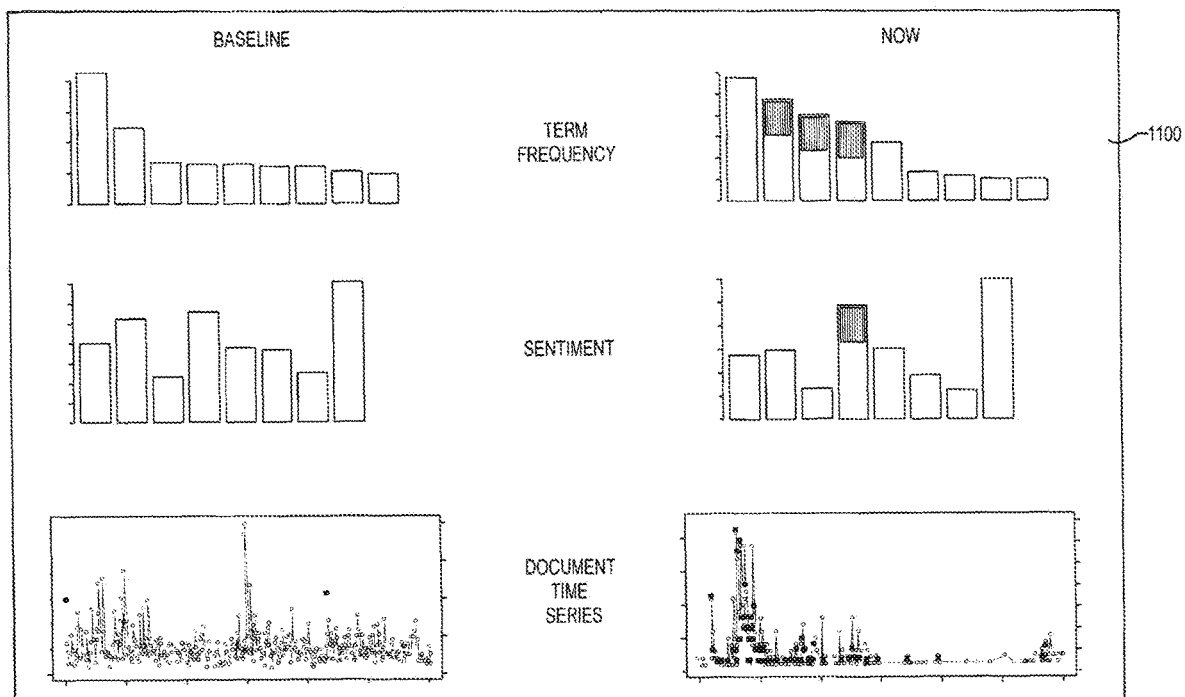
FIG. 11 illustrates a dashboard view of a graphical user interface according to an exemplary embodiment of the present invention.

FIG. 11 illustrates a dashboard view 1100 output by a graphical user interface (for example, the graphical user interface of a client device 160) according to an exemplary embodiment of the present invention.

As shown in FIG. 11, the system 200 may provide functionality for the user to view a previously established baseline (left column) of any number of metrics 218, including term frequency (e.g., as shown in FIG. 9B), sentiment (e.g., as shown in FIG. 9C), a document time series (e.g., as shown in FIG. 9A), etc. Additionally, the dashboard view 1100 may provide more current data (right column) of those metrics 218 to identify deviations from those baselines that may be indicative of an event of interest in a particular domain (e.g., a food integrity event).

Testing Generated Hypotheses

As described above, the system 200 generates hypotheses 260 by coding textual documents from a corpus of proprietary data 214 (and, optionally, public data 212) according to an ontology 220 and using an optimization algorithm to identify and rank neighborhoods in the resulting ontology space 240 that correspond with potentially relevant hypotheses 260. Meanwhile, the system 200 also provides functionality to identify events by extracting numerical metrics 218 from the proprietary data 214 (and, optionally, public data 212) and plotting changes to those numerical metrics 218. Accordingly, the system 200 provides unique functionality to both generate potentially relevant hypotheses 260 and test if evidence of those hypotheses 260 can be found in public data 212.

To facilitate the identification of numerical metrics 218 that may provide evidence to test the identified hypotheses 260, the system 200 may include an observables library 270, which stores links between vocabulary terms (e.g., nouns and verbs) from the ontology 220 and observables in public data 212 that may be used to construct the numerical metrics 218. Therefore, for each hypothesis 260 generated using the hypotheses generation process 300, the system 200 may use the links stored in the observables library 270 to identify relevant numerical metrics 218 to extract and plot to test that hypotheses 260. Accordingly, the system 200 provides functionality for a user to extract and plot the numerical metrics 218 associated with an identified hypothesis 260 or may automatically extract and/or plot the numerical metrics 218 that are associated with one or more of the hypotheses 260 generated by the system 200.

For example, the observables library 270 may store a link between the ontology term "drought" and observable public data 212 such as temperature, rainfall, data from remote sensing equipment, etc. Therefore, if the hypotheses generation process 300 identifies a hypothesis 260 indicating a drought, the observables library 270 may link that hypothesis 260 to numerical metrics 218, such as numerical temperature records or satellite-derived Normalized Differential Vegetation Indices, that can be extracted and plotted to look for evidence of that hypothesis 260. Critically, the observables library 270 enables the system 200 to link an ontological term in a hypothesis 260 to numerical metric(s) 218 that are not part of the proprietary data 214 used to generate that hypothesis 260 to test whether a hypothesis 260 generated based on proprietary data 214 may be observed in public data 212.

The observables library 270 may store links between vocabulary terms in the ontology 220 and numerical metrics 218 already available in the public data 212 stored on the system memory 142. Additionally or alternatively, the observables library 270 may store links between vocabulary terms in the ontology 220 and numerical metrics 218 available from persistently available public data sources 112. Accordingly, the system 200 may provide functionality to download numerical metrics 218 from public data sources 112 to test a generated hypothesis 260. For example, if the system 200 were to identify a hypothesis 260 that weather trends were causing price changes or ingredient shortages that could lead to food adulteration, the observables library 270 may assemble a timeline of weather reports in relevant geographic areas in collected documents already included in the data 210 or access weather data from persistent public data sources 112.

The links between the vocabulary terms in an ontology 220 and the relevant numerical metrics 218 in the observables library 270, which are preferably vetted by subject matter experts, may initially be received from a public data source 112. Over time, however, the system 200 may provide functionality for individuals using the system 200 to store additional links to numerical metrics 218 when using the system 200 to test hypotheses 260 that include the ontological terms. Accordingly, additions or augmentations to the observables library 270 will enable other users to quickly identify numerical metrics 218 when testing hypotheses 260 that include the same ontological terms. For example, additional links between vocabulary terms in the ontology 220 and relevant numerical metrics 218 may be added when testing hypotheses 260 discussing contaminants and tests used to discover contaminants, outbreaks related to weather trends, adulteration related to economic trends, etc.

Regardless of whether the system 200 is used to generate a hypothesis 260, expert users of the system 200 can identify, extract, and plot whatever numerical metric 218 that a particular expert intuits may provide evidence of a hypothesis 260 based on a priori knowledge. However, to better test those hypotheses 260, the system 200 uses links stored in the observables library 270 to automate identification of numerical metrics 218 that may be further beneficial to test that hypothesis 260.

The observables library 270 is stored in the system memory 142 so that the links to observables in the public data 212 persist over time and be used, as needed, to test newer hypotheses 260. The observables library 270 stored in the system memory 142 does not include links to observable metrics found only in proprietary data 214 because the proprietary data 214 is stored only in the volatile memory 144 and, more generally, the computing environment 100 exists to protect the proprietary data 214 and prevent unauthorized users (even users of the co-analysis system 200) to view proprietary data 214. In some limited embodiments, however, a portion of the observables library 270 may be stored in the volatile memory 144 and allow a proprietary data source 114 to link terms (e.g., ontological terms) to observables in their own proprietary data 214. The portion of the observables library 270 stored in the volatile memory 144 may then be used to test hypotheses 260 using numerical metrics 218 constructed using proprietary data 214. However, the linked proprietary data 214 is protected by the physical and data security features described below and the portion of the observables library 270 stored in the volatile memory 144 is erased consistent with the data vanishing criteria (described below).

Other Analysis

While this disclosure describes a hypotheses generation process 300 and event recognition processes 400-800, the secure computing environment 100 is uniquely capable of performing any co-analysis of proprietary data 214 without revealing the underlying proprietary data 214 to a participating proprietary data source 114 or even a human analyst looking at the sanitized analytical results 294 (except designated parties authorized to validate results as described below). However, as described below with reference to the data security and the data sanitization features, it is critical that any analysis performed by system 200 is completely automated (i.e., performed by software modules without human intervention) to ensure that a human analyst cannot view any of the intermediate processing steps or any analytical results that have not first been sanitized by the data sanitization module 290. Furthermore, any analysis performed by system 200 should be agreed upon in advance by all of the participating proprietary data sources 114.

Hardware Security

The computing environment 100 includes a number of hardware security features that are agreed upon by all of the proprietary data sources 114 in advance. Those hardware security features, along with the data security features describe below, enable multiple organizations to co-analyze proprietary data 214 from multiple proprietary data sources 114 without revealing the underlying proprietary data 214 to those who are unauthorized to access it.

Referring back to FIG. 1, the computing environment 100 is referred to as a "black box" because each proprietary data source 114 may only view its own proprietary data 214 and any output generated by the system 200 after it has been processed by the data sanitization module 290 (described below). The proprietary data 214 provided by any other proprietary data source 114 and results of each of the internal processing steps (described above) are not output by the system 200 and are physically inaccessible to any unauthorized user. The computing environment 100 is physically enclosed in a secure enclosure 102 (e.g., a steel box with one or more locks that can only be opened by authorized individuals). The computing environment 100 does not include any peripheral input devices (e.g., a keyboard, a mouse, a touchscreen) or peripheral output devices (e.g., a display) that are physically accessible when the computing environment 100 is locked in the secured enclosure 102. The computing environment 100 does not send or receive wireless communications when locked in the secured enclosure 102, either because the computing environment 100 does not include a wireless transmitter or receiver or because any wireless transmitter and/or receiver is disabled. To that end, the secure enclosure 102 may include electromagnetic shielding that blocks electromagnetic radiation from entering or exiting the secure enclosure 102. The computing environment 100 may also employ additional information security techniques (as described, for example, in the TEMPEST standards), such as sufficient distance from walls, shielding in the building and/or equipment that houses the computing environment 100, distance separating wires carrying proprietary data 214 and wires carrying other signals, filters on cables, and even distance and shielding between wires and/or equipment handing proprietary data 214 and building pipes. In some embodiments, the computing environment 100 may include a hardware port 150 (e.g., an ethernet port) that enables wired communication through the secure enclosure 102. In those embodiments, the hardware port 150 may enable the proprietary data sources 114 to transfer the proprietary data 214 to the computing environment 100 via a web server 130 over the Internet 132 using a secure communication procedure (described below). Other than the optional hardware port 150 that provides wired communication with the optional web server 130, however, the computing environment 100 does not include any hardware ports that are physically accessible when the computing environment 100 is locked in the secured enclosure 102.

The proprietary data 214 are provided to the computing environment 100 from each proprietary data source 114 via encrypted input isolators 155 that enforce one-way data flow. (The computing environment 100 may include individual encrypted input isolators 155*a*, 155*b*, 155*c*, etc. for each proprietary data source 114*a*, 114*b*, 114*c*, etc.) The input isolators 155 may also perform formatting processes such that the proprietary data 214 is stored using the defined structure and format required by the analytic algorithms (e.g., the hypothesis generation module 250, the event recognition module 280, etc.).

The proprietary data 214 (as well as the metrics 218, the hypotheses 260 and the results of the intermediate processing steps described above) are stored on volatile memory 144, ensuring that the proprietary data 214 cannot be transferred by removing the volatile memory 144 (because volatile memory requires power to continue to store data). The computing environment 100 does not create stored copies of the proprietary data 114 that persist past the time period specified by data vanishing criteria (described below).

As described above, the computing environment 100 includes hardware security features to ensure that any proprietary data 214 that enters the black box computing environment 100 does not persist (past the time period specified by the data vanishing criteria described below) and is never able to be physically removed from the computing environment 100. Additionally, as described below, the computing environment 100 also includes data security features to ensure that the underlying proprietary data 214 cannot be accessed by unauthorized individuals, including other proprietary data sources 114 and even analysts viewing the sanitized analytical results 294 generated by the system 200.

Data Security and Data Sanitization

The computing environment 100 also includes a number of data security features that are agreed upon by all of the proprietary data sources 114 in advance.

The computing environment 100 enables an authorized proprietary data source 114 to transfer its proprietary data 214 to the volatile memory 114 by connecting a physical data storage device (e.g., hard drive) to a hardware port of the computing environment 100 when the secure enclosure 102 is opened by an authorized individual. In some embodiments, the computing environment 100 enables an authorized proprietary data source 114 to transfer its proprietary data 214 to the volatile memory 114 via a web server 130 over the Internet 132. Whether the proprietary data 214 is transferred directly using a physical data storage device and a hardware port or via the Internet 132, the proprietary data 214 may be encrypted using an encryption scheme such as an asymmetric encryption scheme (e.g., GPG/PGP/PKI, digital signing), a symmetric-key encryption scheme (e.g., AES, Twofish, Blowfish, 3DES), a combination of an asymmetric encryption scheme and a symmetric-key encryption scheme, etc.

Each proprietary data source 114 may be assigned its own input port, which may be either a hardware port or a virtual port (e.g., provided by the web server 130), to enable multiple proprietary data sources 114 to simultaneously transfer proprietary data 214. As mentioned above, individual encrypted input isolators 155a, 155b, 155c, etc. that enforce one-way data flow may be provided for each proprietary data source 114a, 114b, 114c, etc. The proprietary data 214 need not be anonymized or de-identified because the underlying proprietary data 214 are not shared with unauthorized individuals or organizations.

The system 200 decrypts the proprietary data 214 and stores it in volatile memory 144 for a time period specified by data vanishing criteria that are agreed upon by all of the proprietary data sources 114. In addition to the hardware security features provided by the volatile memory 144 (described above), the data vanishing criteria may include rules (e.g., automatically enforced by the system 200 without human intervention) to ensure that the proprietary data 214 are erased when a prescribed condition is met. The computing environment 100 may erase the proprietary data 214 by powering down the volatile memory 144 and preventing access to the system 200 for sufficient time period after the volatile memory 144 is powered down (e.g., several minutes) to ensure that the volatile memory 144 is cleared. The computing environment 100 may erase the proprietary data 214 by writing over the volatile memory 144. For example, the data vanishing criteria may specify that the proprietary data 214 are erased if the secure enclosure 102 is opened, after a specified time period, etc. Furthermore, the data vanishing criteria may specify that the proprietary data 214 are erased before the system 200 outputs sanitized analytical results 294 as described below.

The analysis that is performed by system 200 (e.g., the hypotheses generation process 300, the event recognition processes 400-800, etc.) should be agreed upon by all of the proprietary data sources 114. Any analysis performed by system 200 (e.g., the hypotheses generation process 300 and the event recognition processes 400-800) is completely automated (i.e., performed by software modules without human intervention) to ensure that a human analyst cannot view any of the intermediate processing steps or any analytical results (e.g., hypotheses 260, numerical metrics 218, potential events, etc.) that have not first been sanitized by the data sanitization module 290.

Before the analytical results (e.g., hypotheses 260 generated by the hypothesis generation module 250, numerical metrics 218, potential events, or regions of interest 482 identified by the event recognition module 280, etc.) are presented to any human analyst, those analytical results are sent to the data sanitation module 290 where the analytical results are sanitized to form sanitized analytical results 294. The data sanitation module 290 performs a final cleaning/sanitization process to ensure that none of the sanitized analytical results 294 are tracible to any particular proprietary data source 114 or data type. Therefore, the system 200 ensures that no analytical result implicates that any particular proprietary data source 114 has access uniquely distinguishable data.

The data sanitation module 290 may sanitize the analytical results, for example using hypothesis obfuscation (e.g., replacing specific elements of hypotheses with synonyms), allowing proprietary data sources 114 to attach tags to elements in their proprietary data 214 that trigger a specific cleaning action (e.g., if <tag> then . . . ), encoding messages so as to be meaningful only in combination with some particular locally-resident data or profile (mosaic inference) stored, for example, in the hardware adapter 154 distributed to the proprietary data source 114. Additional data masking techniques that the data sanitation module 290 may employ include substitution, shuffling, number and date variance, nulling out or deletion, masking out, etc. The data sanitation module 290 may perform static data masking, dynamic data masking, on-the-fly data masking, etc. The data sanitation module 290 may employ statistical data obfuscation (e.g., differential privacy, the DataSifter method, etc.) to rely on stochastic perturbations of the data that preserve some of the statistical properties of the original data.

The analytical results generated by the system 200 (e.g., hypotheses 260 generated by the hypothesis generation module 250, numerical metrics 218 identified by the event recognition module 280, etc.) may be stored in the volatile memory 144 such that they are subject to the data vanishing criteria described above. By contrast, the sanitized analytical results 294 (output by the data sanitization module 290) may be stored in the system memory 142. In those embodiments, once the volatile memory 144 is used to store the (sensitive) proprietary data 214, the volatile memory 144 is not used to store or output the (non-sensitive) sanitized analytical results 294, even after being wiped clean electronically.

The analytical results provided by the system 200 (e.g., hypotheses 260, numerical metrics 218, potential events, etc.) are output only to recipients authorized by the proprietary data sources 114. Authorized proprietary data sources 114 may receive the analytical results by connecting a physical data storage device to a hardware port of the computing environment 100 when the secure enclosure 102 is opened by an authorized individual. In some embodiments, the analytical results may be output to a web server 130 for transmittal to an authorized proprietary data source 114 via the Internet 132. Any analytical results output by the system 200 may be output by the computing environment 100 via an output port (e.g., a hardware port, a virtual port provided by the web server 130, etc.) that is separate from any of the input ports to ensure that ports used to transfer the (sensitive) proprietary data 214 are not also used to output the (non-sensitive) sanitized analytical results 294. Before opening an output port to output the sanitized analytical results 294 stored in the system memory 142, the computing environment 100 may erase all of the proprietary data 214, for example by closing all of the input ports and erasing the volatile memory 144 (e.g., by powering down the input ports and the volatile memory 144 for a time period sufficient to ensure that all of the proprietary data 214 are erased). Each proprietary data source 114 may be assigned its own output port to enable multiple proprietary data sources 114 to simultaneously view the sanitized analytical results 294.

The analytical results may be encrypted (e.g., using an asymmetric encryption scheme and/or a symmetric-key encryption scheme). Each proprietary data source 114 may have a hardware adapter 154 (e.g., the proprietary data source 114c may utilize hardware adapter 154c) that may decrypt the analytical results and/or enforce one-way data flow. The hardware adapters 154 may also perform formatting processes such that the analytical results (e.g., hypotheses 260, numerical metrics 218, etc.) are output in a pre-defined structure and/or format specific to each type of analytical result.

Access to the system 200 is controlled jointly by the participating proprietary data sources 114 (e.g., using multi-part passwords).

Validation

On occasion, an authorized user may need to identify the province of a particular hypothesis 260, numerical metric 218, potential event, region of interest 482, etc. For example, the system 200 may generate a hypothesis 260 that is so unexpected that a user may wish to investigate the piece of proprietary data 114 that, when coded using an ontology 220, formed the point in the ontology space 240 corresponding to the unexpected hypothesis 260. In another example, the event recognition module 280 may identify a potential event that is so unexpected that a user may wish to investigate the piece of proprietary data 114 that caused the system to determine that a numerical metric 218 deviated from a previously-established baseline. However, the system 200 ensures that the proprietary data 214 are not revealed to unauthorized individuals (e.g., competitors of the proprietary data source 114 that provided that proprietary data 214).

As mentioned above, all of the proprietary data 214 are well specified in terms of type, structure, and format. One part of that structure is that each piece of proprietary data 214 includes at least one data field that identifies the source of that piece of proprietary data 214 (e.g., the proprietary data 214a is identified as originating from proprietary data source 114a). Then, the system 200 provides functionality for authorized personnel (e.g., a neutral party that is not affiliated with any of the competitive proprietary data sources 114) to view the source of underlying proprietary data 214 that lead to a particular analytical result. Those authorized to perform validation are preferably authorized by all of the proprietary data sources 114 to validate. Each piece of proprietary data 214 may even include multiple data fields, which identify the source of that piece of proprietary data 214 with greater specificity, with each progressively more specific description of the source being stored in a data field that is only visible to personnel with a progressively higher authorization level.

Benefits of the System

As described above, existing threat surveillance systems may collect public domain data in combination with a single organization's protected, competition-sensitive data. Competitive organizations do not—and cannot—get access to the protected data of competitor organizations, which may be unique and complementary. As a result, existing threat surveillance techniques cannot overcome the problem that competitive organizations each have a piece of the complex situational awareness puzzle and therefore may be blind to emerging, unrecognized threats. Furthermore, existing threat surveillance systems may be unable to resolve potential data conflicts because typically correction schemes require multiple sources of evidence and rely on majority voting techniques.

Unlike existing threat surveillance systems, the "black box" computing environment 100 provides a secure system where proprietary data sources 114 maintain control of their proprietary data 214 in a physical device that is safe from leaks. The system 200 then allows all of the participating proprietary data sources 114 to co-analyze all of the proprietary data 214 in a secure way that does not jeopardize the competitive advantages of any of the proprietary data sources 114. Additionally, because the underlying proprietary data 214 are not shared with unauthorized individuals or organizations (and are not visible to human analysts), the proprietary data 214 do not need to be de-anonymized or de-identified, removing the requirement for data pre-processing.

The co-analysis system 200 is then able to analyze the proprietary data 214 (as well as public data 212) in real time to generate hypotheses or identify evidence of an event. Because those hypotheses and potential events are generated by the proprietary data 214 (rather than relying on a human analysts to speculate which keywords or numerical variables to monitor), the system 200 is able to identify emerging or yet-unrecognized threats (i.e., surprises) rather than merely confirming or refuting suspicions that a human analyst theorizes based on a priori knowledge. The co-analysis system 200 is then able to detect recognized and unrecognized threats early and enable mitigation (or at least a potential reduction of harm).

While preferred embodiments have been set forth above, those skilled in the art who have reviewed the present disclosure will readily appreciate that other embodiments can be realized within the scope of the invention. For example, disclosures of specific numbers of hardware components, software modules and the like are illustrative rather than limiting. Therefore, the present invention should be construed as limited only by the appended claims.

What is claimed is:

1. A system for co-analyzing proprietary data while preventing distribution of the proprietary data, the system comprising:
    one or more ports that receive proprietary data from a plurality of proprietary data sources;
    a secure enclosure with a door and a lock; and
    a computing environment, within the secure enclosure, comprising:
        non-transitory volatile memory;
        non-transitory system memory that stores software modules; and
        a processing unit that:
            stores the proprietary data from each of the plurality of proprietary data sources in the volatile memory without storing the proprietary data in non-volatile memory;
            forms an unsanitized analytical result by co-analyzing the proprietary data from at least two of the plurality of proprietary data sources, wherein the processing unit co-analyzes the proprietary data by executing instructions stored on non-transitory system memory without human intervention;
            stores the unsanitized analytical result in the volatile memory without storing the unsanitized analytical result in non-volatile memory;
            forms a sanitized analytical result by sanitizing the unsanitized analytical result, wherein the processing unit sanitizes the unsanitized analytical result by changing one or more data elements in the unsanitized analytical result such that the sanitized analytical result is untraceable to any data type or any of the proprietary data sources; and
            outputs the sanitized analytical result to one of the proprietary data sources without outputting the unsanitized analytical result to any of the plurality of proprietary data sources.

2. The system of claim 1, wherein the processing unit sanitizes the unsanitized analytical result using hypothesis obfuscation, providing functionality for the proprietary data sources to attach tags to elements in the proprietary data that trigger a specific cleaning action, providing functionality to encode messages in the proprietary data that are meaningful only in combination with a particular locally-resident data or profile, or using a data masking technique.

3. The system of claim 1, wherein the processing unit stores the sanitized analytical result in the system memory.

4. The system of claim 1, wherein the processing unit erases the proprietary data stored in the volatile memory according to data vanishing criteria stored in the system memory.

5. The system of claim 1, wherein the processing unit outputs the sanitized analytical result without outputting the proprietary data to unauthorized users.

6. The system of claim 5, wherein the processing unit further provides functionality for authorized users to view the proprietary data used by the processing unit to form the sanitized analytical result.

7. The system of claim 6, wherein the proprietary data includes at least one data field that identifies the proprietary data source and the computing environment provides functionality for only authorized users to view the proprietary data source stored in the at least one data field.

8. The system of claim 1, wherein:
the one or more ports are virtual ports of a web server; and
the computing environment provides functionality for the proprietary data sources to transmit the proprietary data for storage in the volatile memory over the Internet via the web server.

9. The system of claim 1, wherein:
the one or more ports are hardware ports that are only accessible when the door of the secure enclosure is open; and
the computing environment provides functionality for each of the plurality of proprietary data sources to transmit the proprietary data for storage in the volatile memory via one of the hardware ports.

10. The system of claim 1, wherein each port receives proprietary data from a respective one of the plurality of proprietary data sources.

11. The system of claim 10, further comprising:
an encrypted input isolator for each port that enforces one-way data flow from the respective proprietary data source.

12. The system of claim 11, wherein:
the computing environment provides functionality for the proprietary data sources to transmit encrypted proprietary data; and
the processing unit decrypts the encrypted proprietary data.

13. The system of claim 1, wherein:
the processing unit encrypts the sanitized analytical result and outputs the encrypted sanitized analytical result to one of the proprietary data sources.

14. The system of claim 13, further comprising:
a hardware adapter for each of the plurality of proprietary data sources that decrypts the encrypted sanitized analytical result.

15. The system of claim 1, wherein:
the computing environment does not include any peripheral input devices or peripheral output devices outside the secure enclosure;
the computing environment does not communicate wirelessly when locked in the secure enclosure; and
the secure enclosure prevents access to hardware ports of the computing environment when the door is closed.

16. The system of claim 1, wherein the processing unit co-analyzes the proprietary data by:
coding the proprietary data according to the ontology;
populating a multi-dimensional ontology space by adding points in the ontology space that correspond to ontological vectors found in the documents;
using an optimization algorithm to identify highly-populated neighborhoods in the ontology space; and
identifying one or more hypotheses corresponding to one or more of highly-populated neighborhoods in the ontology space.

17. The system of claim 1, wherein the processing unit co-analyzes the proprietary data by:
analyzing the proprietary data to construct one or more numerical metrics;
identifying a baseline for each of the one or more numerical metrics;
receiving additional documents;
analyzing additional documents to identify one or more updated numerical metrics; and
identifying one or more updated numerical metrics that deviate from the baseline.

18. A method of co-analyzing proprietary data while preventing distribution of the proprietary data, the method comprising:
receiving proprietary data from each of a plurality of proprietary data sources;
storing the proprietary data received from the plurality of proprietary data sources in non-transitory volatile memory without storing the proprietary data in non-volatile memory;
forming an unsanitized analytical result by co-analyzing the proprietary data from at least two of the plurality of proprietary data sources, wherein co-analyzing the proprietary data comprises executing instructions stored on non-transitory system memory without human intervention;
storing the unsanitized analytical result in non-transitory volatile memory without storing the unsanitized analytical result in non-volatile memory;
forming a sanitized analytical result by sanitizing the unsanitized analytical result, wherein sanitizing the unsanitized analytical result comprises changing one or more data elements in the unsanitized analytical result such that the sanitized analytical result is untraceable to any data type or any of the proprietary data sources; and
outputting the sanitized analytical result to one of the proprietary data sources without outputting the unsanitized analytical result to any of the proprietary data sources.

* * * * *